United States Patent
Blalock et al.

(10) Patent No.: US 6,249,269 B1
(45) Date of Patent: Jun. 19, 2001

(54) ANALOG PIXEL DRIVE CIRCUIT FOR AN ELECTRO-OPTICAL MATERIAL-BASED DISPLAY DEVICE

(75) Inventors: Travis N. Blalock, Santa Clara; Neela B. Gaddis, Saratoga; Richard C. Walker, Palo Alto, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/070,669

(22) Filed: Apr. 30, 1998

(51) Int. Cl.[7] ............................... G09G 3/36; G09G 5/00
(52) U.S. Cl. .......................... 345/97; 345/99; 345/100; 345/204; 345/214
(58) Field of Search .......................... 345/98, 97, 100, 345/204, 8, 94, 89, 92, 99, 212, 214

(56) References Cited

U.S. PATENT DOCUMENTS

| 5,500,748 | 3/1996 | Gaalema et al. | 359/55 |
|---|---|---|---|
| 5,523,864 | 6/1996 | Gaalema et al. | 359/55 |
| 5,552,916 | 9/1996 | O'Callaghan et al. | 359/95 |
| 5,596,451 | 1/1997 | Handschy et al. | 359/633 |
| 5,708,454 | 1/1998 | Katoh et al. | 345/100 |
| 5,745,087 | 4/1998 | Tomiyoshi et al. | 345/89 |
| 5,777,591 | 7/1998 | Katoh et al. | 345/92 |
| 5,812,101 | * 9/1998 | Monarchie et al. | 345/8 |
| 5,977,940 | 11/1999 | Akiyama et al. | 345/94 |
| 5,977,942 | * 11/1999 | Walker et al. | 345/97 |
| 6,072,454 | * 6/2000 | Nakai et al. | 345/97 |

FOREIGN PATENT DOCUMENTS

| 0 586 155 A2 | 3/1994 | (EP) | G09G/3/36 |
|---|---|---|---|
| 0797182 | 9/1997 | (EP) . | |
| WO 94/07177 | 3/1994 | (WO) | G02F/1/136 |

* cited by examiner

*Primary Examiner*—Bipin Shalwala
*Assistant Examiner*—David L Lewis
(74) *Attorney, Agent, or Firm*—Ian Hardcastle

(57) ABSTRACT

The analog drive circuit drives a pixel electrode in response to an analog sample derived from a video signal. The analog drive circuit comprises a sample selection section and a drive signal generator. The sample selection section receives and temporarily stores the analog sample during a sample load period. The drive signal generator generates a drive signal and applies the drive signal to the pixel electrode during a display period that follows the sample load period. The drive signal is composed of a sequence of a first temporal portion and a second temporal portion. The first temporal portion has a time duration substantially proportional to the analog sample temporarily stored in the sample selection section. The second temporal portion is the temporal complement of the first temporal portion.

28 Claims, 16 Drawing Sheets

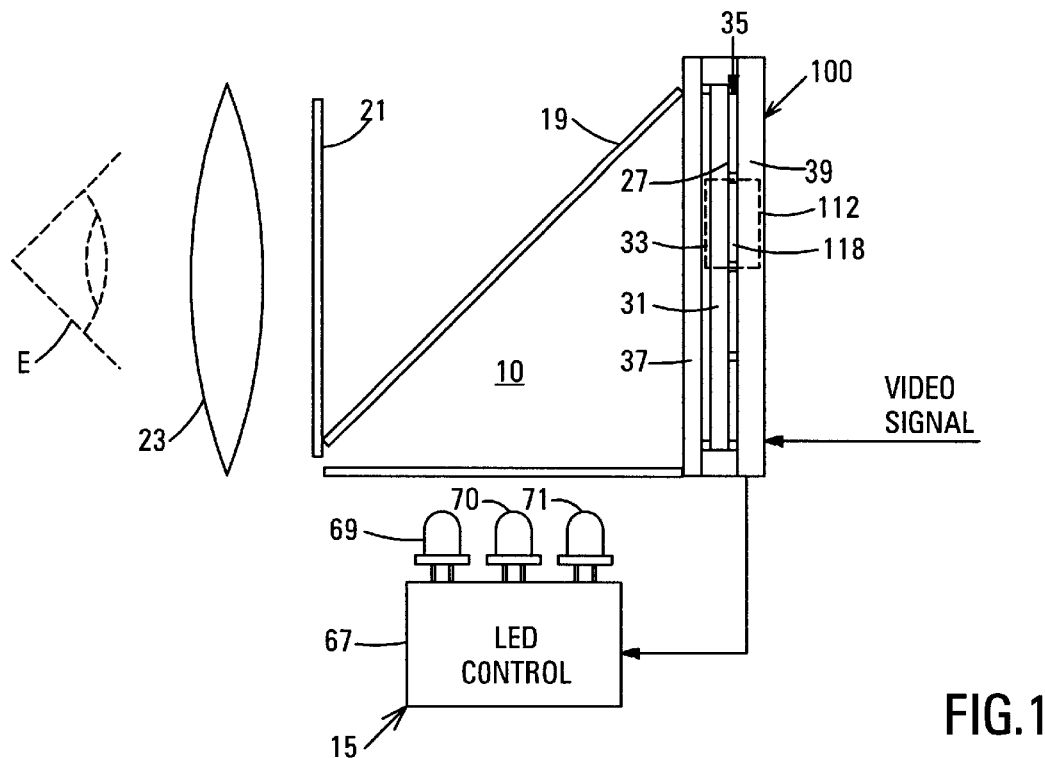
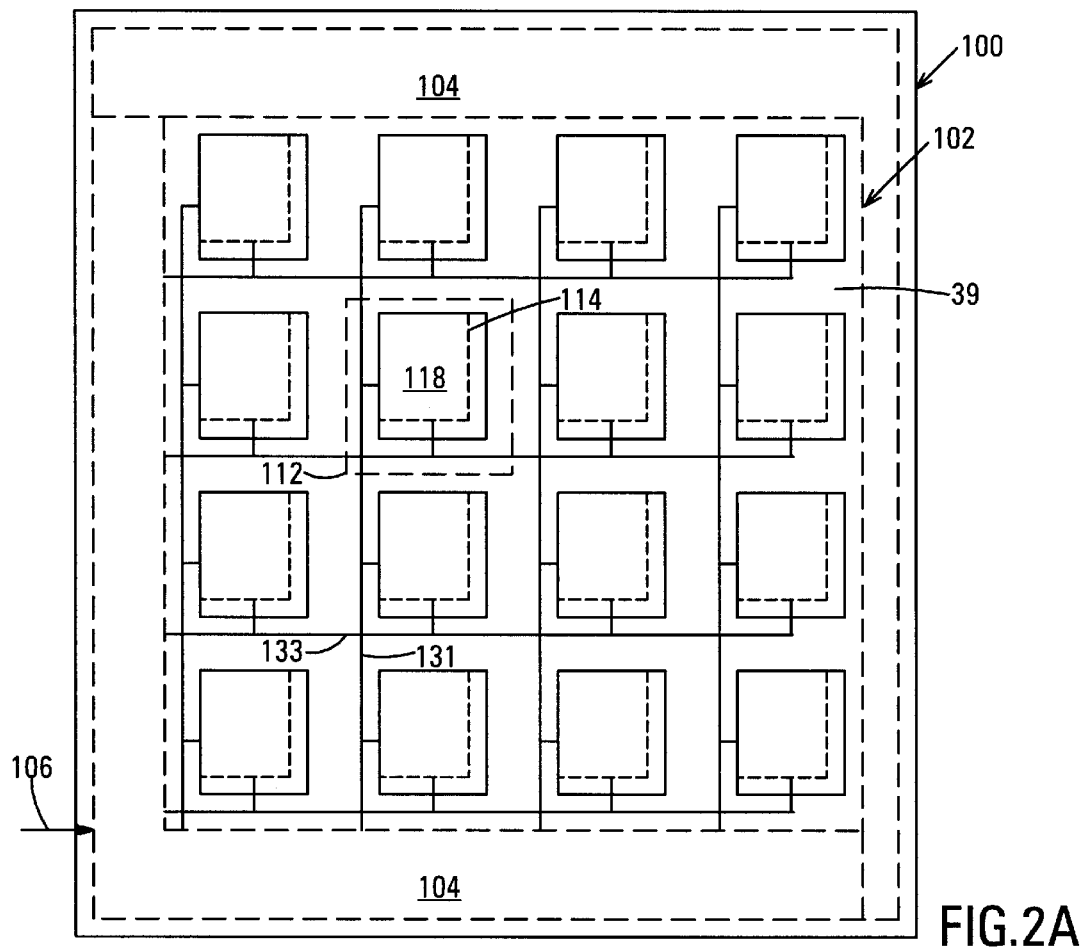
FIG.1
FIG.2A

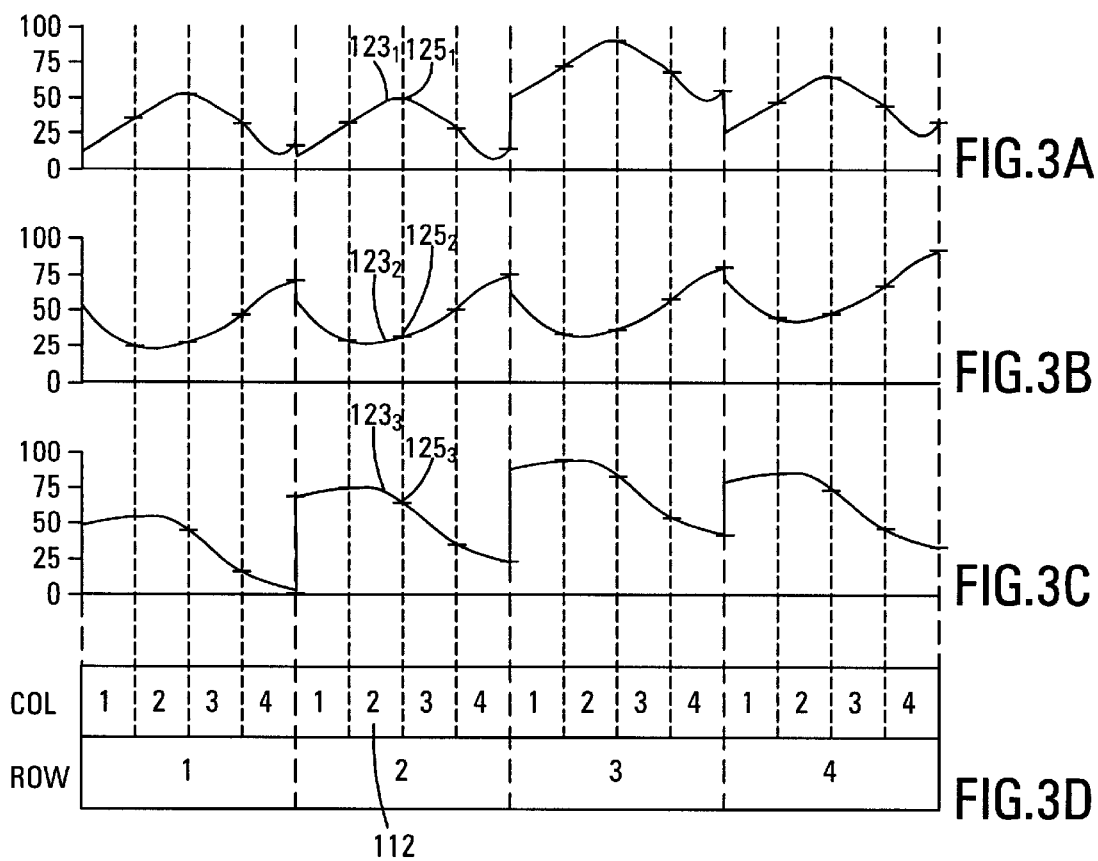
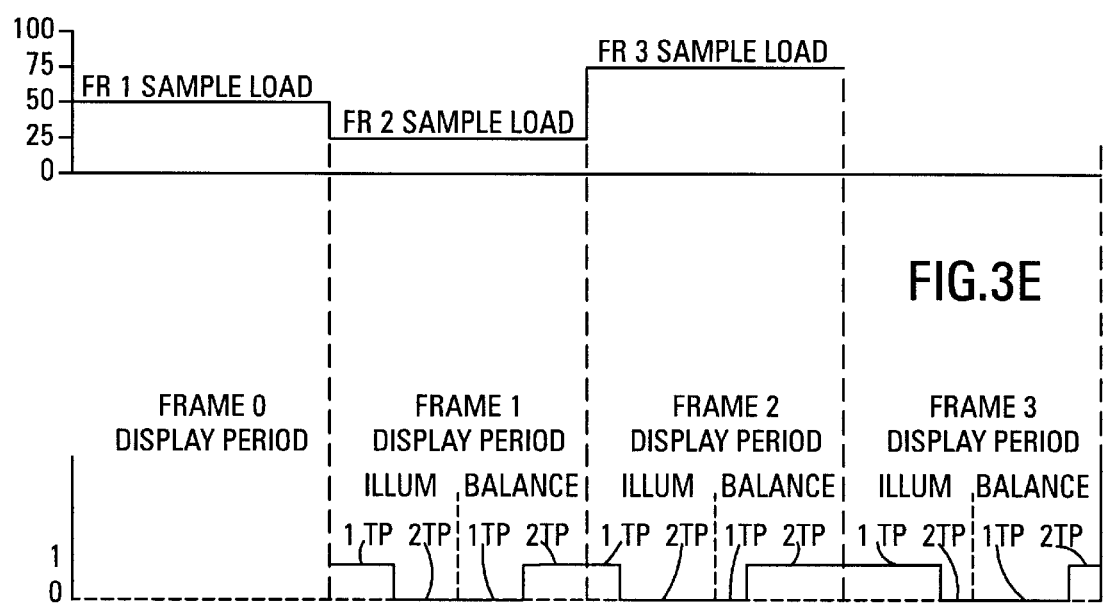

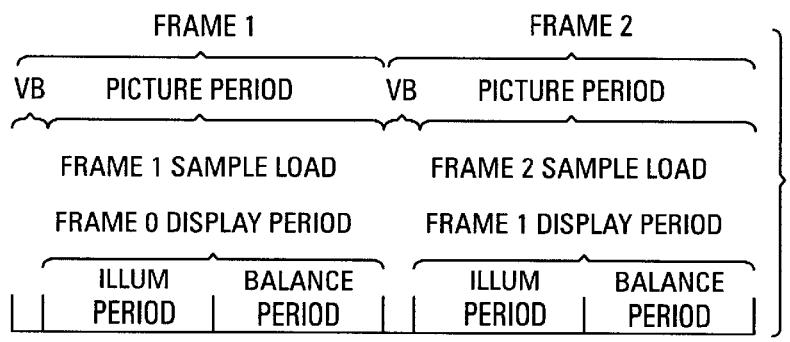
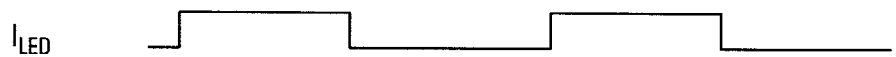
FIG.5A
FIG.5B
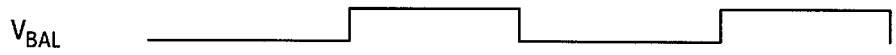
FIG.5C
FIG.5D
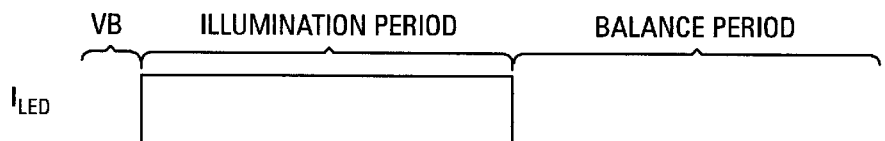
FIG.7A
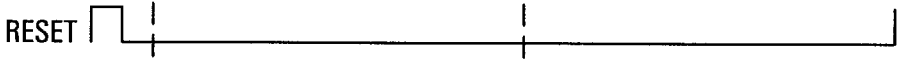
FIG.7B
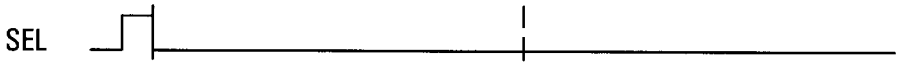
FIG.7C
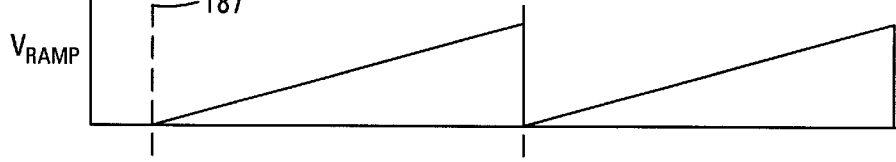
FIG.7D
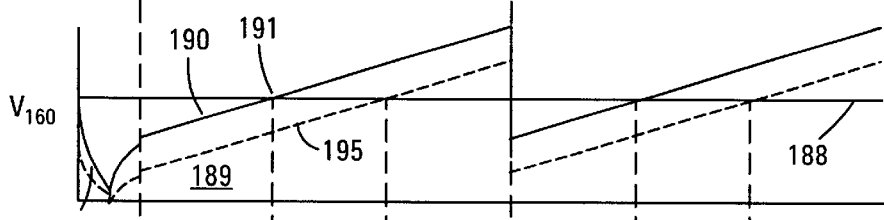
FIG.7E
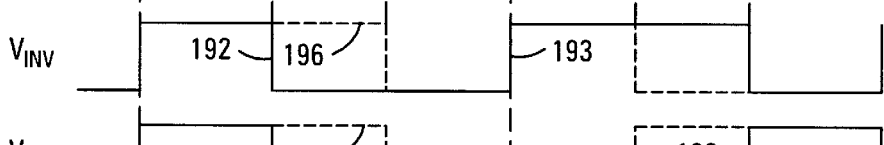
FIG.7F
FIG.7G

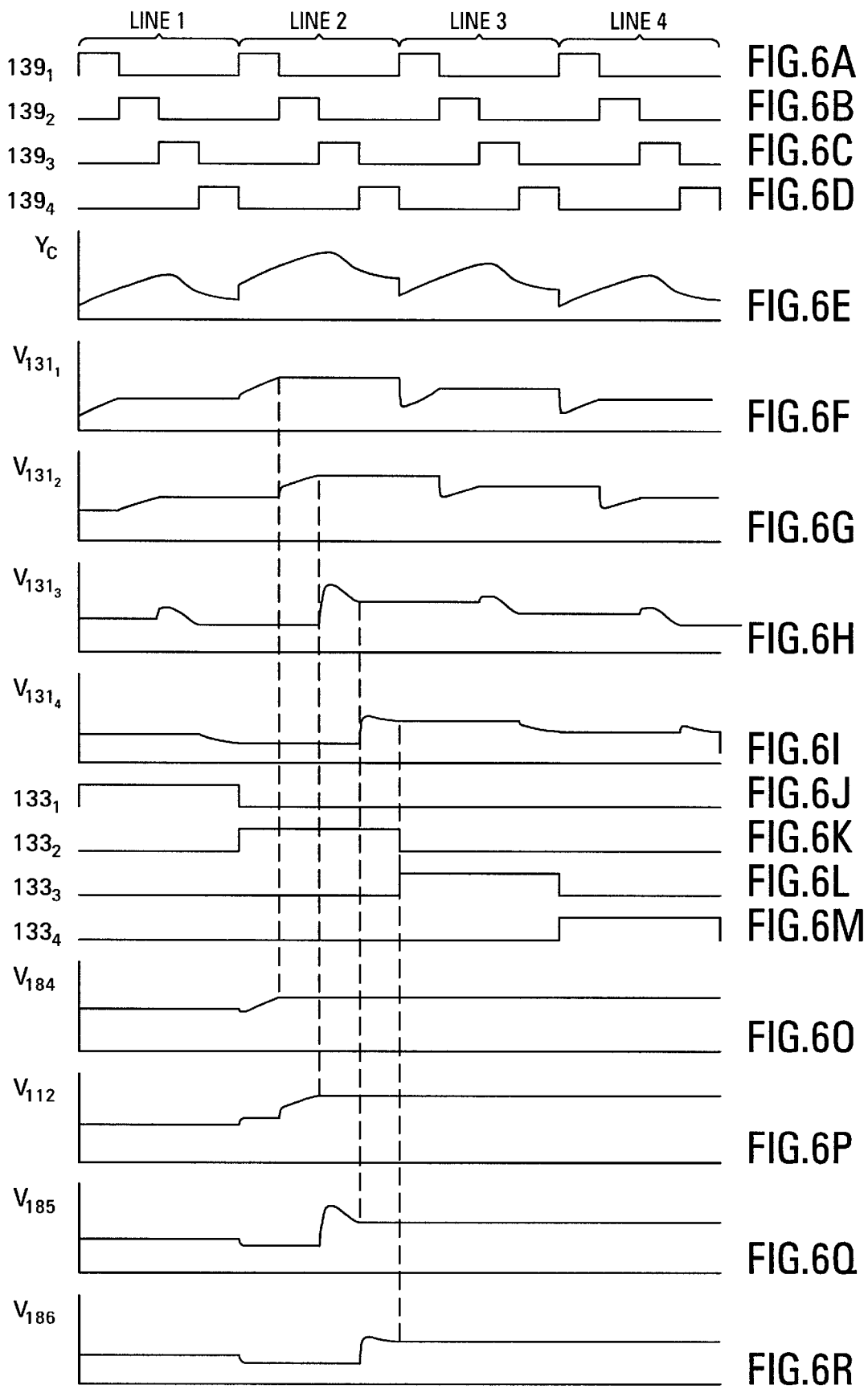

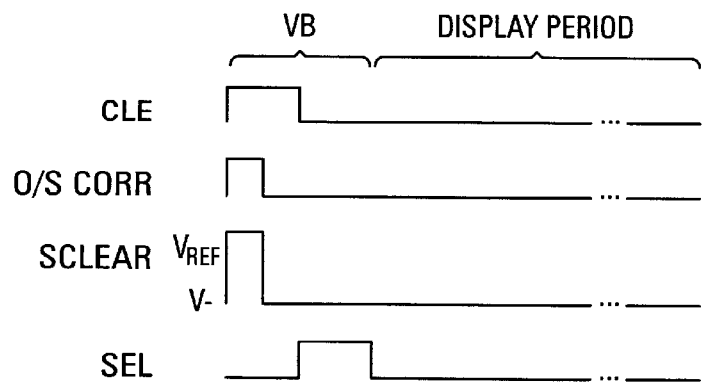
FIG.9A
FIG.9B
FIG.9C
FIG.9D
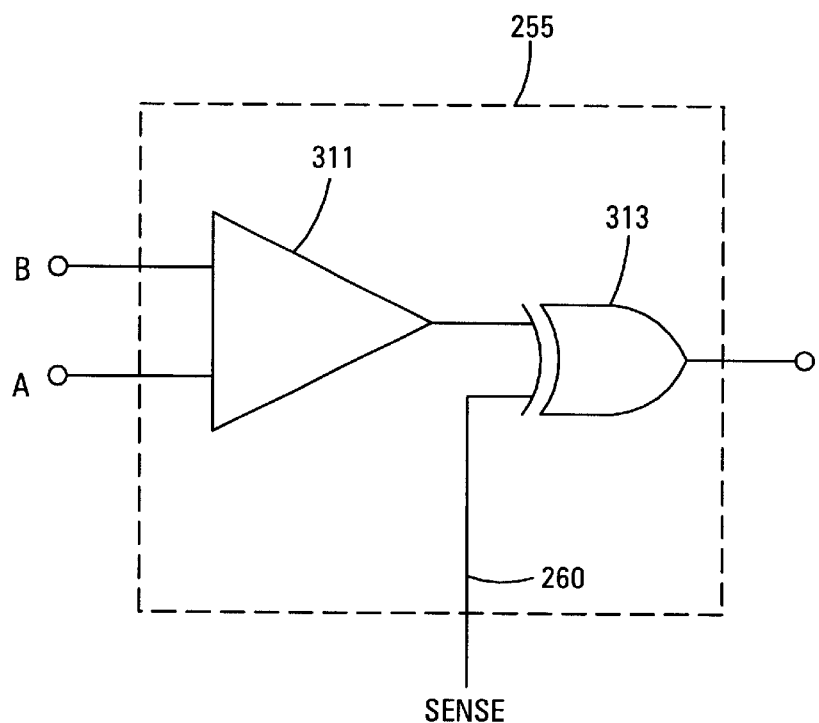
FIG.12
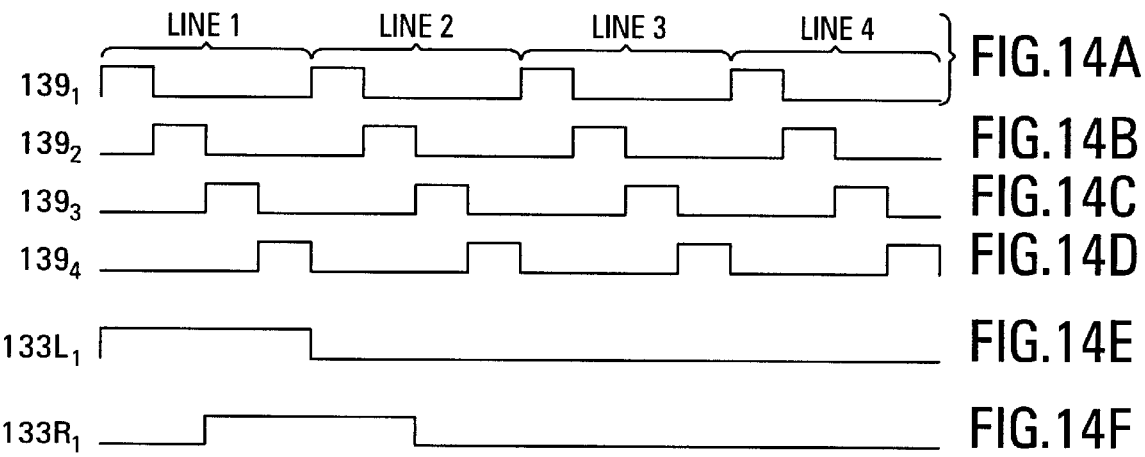
FIG.14A
FIG.14B
FIG.14C
FIG.14D
FIG.14E
FIG.14F

FIG.11A
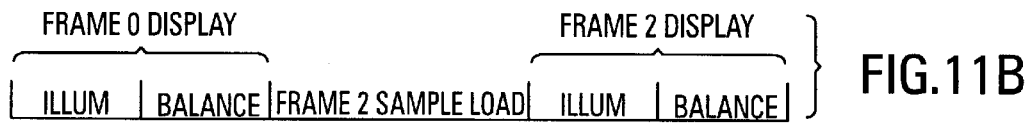
FIG.11B
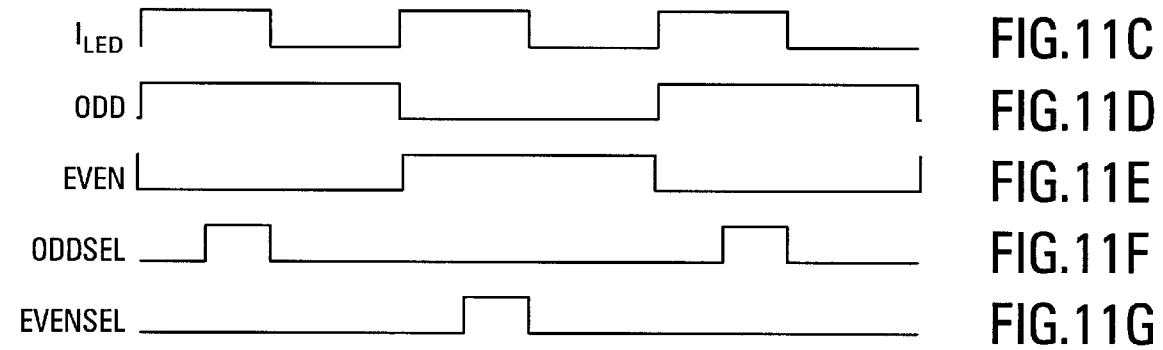
FIG.11C
FIG.11D
FIG.11E
FIG.11F
FIG.11G
FIG.11H
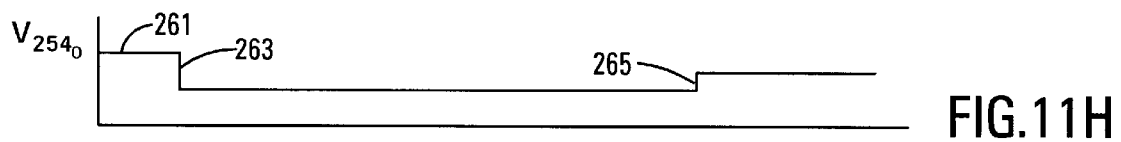
FIG.11I
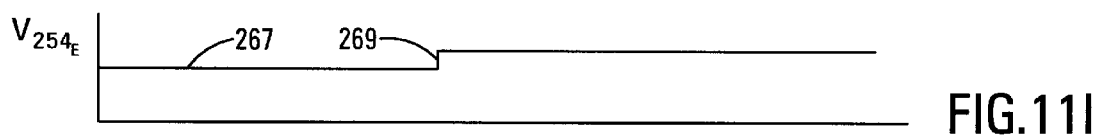
FIG.11J
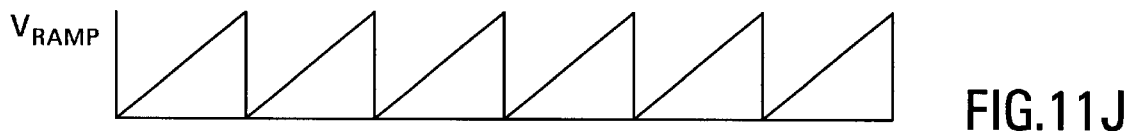
FIG.11K
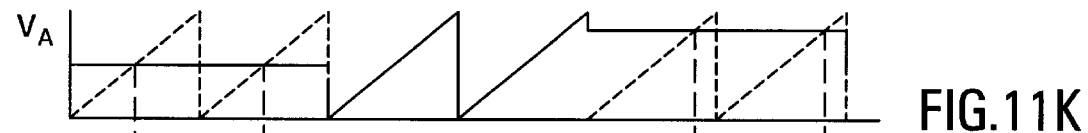
FIG.11L
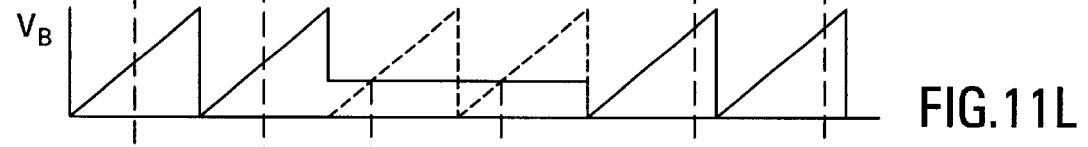
FIG.11M
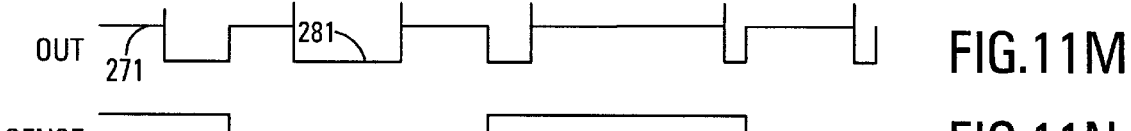
FIG.11N
FIG.11O
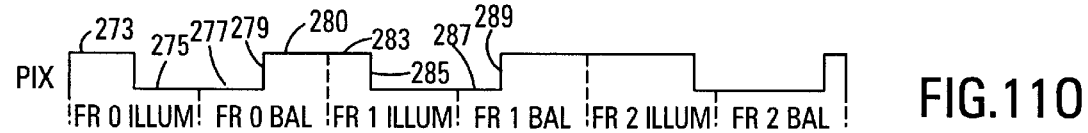

ANALOG PIXEL DRIVE CIRCUIT FOR AN ELECTRO-OPTICAL MATERIAL-BASED DISPLAY DEVICE

FIELD OF THE INVENTION

The invention relates video and graphics display devices, to analog circuits for driving the picture elements (pixels) of video and graphics display devices, and, in particular, to analog circuits for driving the picture elements of a display device based on an electro-optical material.

BACKGROUND OF THE INVENTION

A substantial need exists for various types of video and graphics display devices with improved performance and lower cost. For example, a need exists for miniature video and graphics display devices that are small enough to be integrated into a helmet or a pair of glasses so that they can be worn by the user. Such wearable display devices would replace or supplement the conventional displays of computers and other devices. In particular, wearable display devices could be used instead of the conventional displays of laptop and other portable computers. Potentially, wearable display devices can provide greater brightness, better resolution, larger apparent size, greater privacy, substantially less power consumption and longer battery life than conventional active matrix or double-scan liquid crystal-based displays. Other potential applications of wearable display devices are in personal video monitors, in video games and in virtual reality systems.

Miniaturized displays based on cathode-ray tubes or conventional liquid crystal displays have not been successful in meeting the demands of wearable displays for low weight and small size. Of greater promise is a micro display of the type described in U.S. Pat. No. 5,596,451 of Handschy et al., the disclosure of which is incorporated into this disclosure by reference. This type of micro display includes a reflective spatial light modulator that uses a ferroelectric liquid crystal (FLC) material as its light control element.

The spatial light modulator of the FLC-based micro display just described is driven by a digital drive signal. The conventional analog video signal generated by the graphics card of a personal computer, for example, is fed to a converter that converts the analog video signal into a digital bitstream suitable for driving the spatial light modulator. The converter converts the analog video signal into a time domain binary weighted digital drive signal suitable for driving the spatial light modulator. The time durations of the bits of the time domain binary weighted digital drive are binary weighted, so that the duration of the most-significant bits is $2^{n-1}$ times that of the least-significant bits, where n is the number of bits representing each sample of the analog video signal. For example, if each sample of the analog video signal is represented by 8 bits, the duration of each most-significant bit is 256 times that of each least-significant bit. Driving the pixels digitally means that the pixel driver must be capable of changing state several times during each frame of the analog video signal. The switching speed must be shorter than the duration of the least-significant bit. This requires that the drive circuitry in each pixel be capable of high-speed operation, which increases the power demand and expense of the micro display system. On the other hand, the long time duration of the most-significant bits of the digital drive signal means that the digital drive signal is static for the majority of the frame period.

Practical embodiments of the micro display referred to above typically locate the converter referred to above external of the micro display and connect the converter to the micro display by a high-speed digital link. The converter time multiplexes the digital drive signals for transmission though the digital link as follows: the least-significant bits for of the digital drive signals all the pixels of the spatial light modulator, followed by the next-least-significant bits of the digital drive signals for all the pixels, and so on through the most-significant bits of the digital drive signals for all the pixels. The digital link must be capable of transmitting all the bits representing each frame of the component video signal within the frame period of the component video signal. The digital link, its driver and receiver must be capable of switching at a switching speed shorter than the duration of the least-significant bit, yet remain static for times corresponding to the durations of the most-significant bits.

In addition, the converter requires a large, high-speed buffer memory to convert the parallel, raster-scan order digital signals generated from the analog video signal to a bit-order signal for each color component. This increases the cost and power requirements of the converter.

The digital serial link can be eliminated by locating the converter in the micro display itself, but relocating the converter increases the size, weight and complexity of the micro display. Moreover, miniaturizing the converter to fit it in the micro display can increase the cost of the converter. Finally, relocating the converter does not reduce its overall cost and complexity.

What is needed is a miniature display device that can operate in response to a video signal or graphics data and that does not suffer from the size, weight, complexity and cost disadvantages of the conventional digitally-driven micro display.

Conventional-sized video and graphics displays rely on cathode-ray tubes or full-size liquid crystal displays. The former are bulky, heavy and fragile. The former are also expensive to produce and are very heavy in the larger sizes required to realize the benefits of high-definition video. The latter are expensive to produce in screen sizes comparable with conventional cathode-ray tubes, and have a limited dynamic range and a limited viewing angle. What is also needed is a miniature display device that can form the basis of an full-size video and graphics display that would provide an effective alternative to conventional cathode-ray tubes and liquid crystal displays.

SUMMARY OF THE INVENTION

The invention provides an analog drive circuit for driving a pixel electrode in response to an analog sample derived from a video signal. The analog drive circuit comprises a sample selection section and a drive signal generator. The sample selection section receives and temporarily stores the analog sample during a sample load period. The drive signal generator generates a drive signal and applies the drive signal to the pixel electrode during a display period that follows the sample load period. The drive signal is composed of a sequence of a first temporal portion and a second temporal portion. The first temporal portion has a time duration substantially proportional to the analog sample temporarily stored in the sample selection section. The second temporal portion is the temporal complement of the first temporal portion.

The sample storage section may include a sample storage element, a sample selection gate, and a sample output gate. The sample selection gate opens during the sample load period to admit the analog sample to the sample storage element and is closed during a display period that follows the sample load period. The sample output gate opens either during or prior to the display period and is disposed between the sample storage element and the drive signal generator.

The drive signal generator may include a comparator that generates the drive signal and that comprises a first input to which the sample selection section is connected, and a second input to which a ramp signal is connected. The ramp signal has a duration equal to the display period.

The comparator may have a detection sense set by a sense control signal having opposite states in consecutive frames of the video signal. In this case, the analog drive circuit additionally includes first and second switching arrangements. The first switching arrangement alternately connects a ramp signal to (a) the first input and (b) the second input of the comparator in consecutive display periods. The second switching arrangement alternately connects the sample storage section to (a) the second input and (b) the first input of the comparator in consecutive display periods.

The ramp signal may have a non-linear slope to provide gamma correction.

The drive signal generator may alternatively include an inverter that generates the drive signal, a capacitor and a switch. The capacitor has a first electrode connected to the input of the inverter and to the sample selection section, and a second electrode connected to a ramp signal having a duration equal to the display period. The switch discharges the capacitor prior to the display period.

The drive signal generator may additionally include a coupling capacitor and an additional switch. The coupling capacitor couples the input of the inverter to the sample selection section. The additional switch temporarily connects the output of the inverter to the input of the inverter prior to the display period. The switch is coupled to a reference signal that has a state equal to a predetermined inverter threshold voltage when the additional switch connects the output of the inverter to the input.

The above-mentioned sequence of the first temporal portion and the second temporal portion may be a first sequence of the first temporal portion and the second temporal portion and may have a duration equal to one half of the display period, and the drive signal generator may generate the drive signal in a first electrical state during the first temporal portion and in a second electrical state during the second temporal portion. In this case, the drive signal generator may generate the drive signal additionally composed of a second sequence of the first temporal portion, in which the drive signal is in the second electrical state, and the second temporal portion, in which the drive signal is in the first electrical state. The first temporal portion and the second temporal portion may be in any order in the second sequence. The second sequence restores the DC balance of the pixel.

When the analog drive circuit is for driving an electro-optical material having a bistable characteristic, the drive signal may be composed of pulse having a first polarity at the beginning of the first temporal portion and a pulse having a second polarity, opposite the first polarity, at the beginning of the second portion. To generate this drive signal, the drive signal generator may include an a.c.—coupled output.

BRIEF DESCRIPTION OF THE DRAWINGS

FIG. 1 shows the structure of a display device that incorporates the analog drive circuit according to the invention.

FIGS. 2A–2D show details of the spatial light modulator of the display device shown in FIG. 1.

FIGS. 3A–3D illustrate how analog samples are derived from the video signal and distributed to the analog drive circuit of each pixel in the pixel array of the spatial light modulator shown in FIGS. 2A–2D.

FIG. 3E shows the analog samples derived from the three frames of the video signal shown in FIGS. 3A–3C stored in the sample selection section of the analog drive circuit of an exemplary pixel of the pixel array.

FIG. 3F shows the drive signals generated by the analog drive circuit in response to the analog samples shown in FIG. 3E.

FIGS. 5A–5D are waveform diagrams illustrating the operation of the embodiment of the display device shown in FIG. 4A.

FIGS. 6A–6R are waveform diagrams illustrating the operation of the embodiment of the sample derivation and distribution circuit shown in FIG. 4A.

FIGS. 7A–7G are waveform diagrams illustrating the operation of the embodiment of the analog drive circuit shown in FIG. 4B.

FIGS. 9A–9D are waveform diagrams illustrating the operation of the offset minimizing circuitry of the embodiment shown in FIG. 8.

FIGS. 11A–11O are waveform diagrams illustrating the operation of the embodiments of the display device, the sample derivation and distribution circuit and the analog drive circuit shown in FIGS. 10A and 10B.

FIG. 12 is a block diagram of an example of a switched-sense comparator suitable for use in the embodiments of the analog drive circuit shown in FIGS. 10B, 15C and 16B.

FIGS. 14A–14F are waveform diagrams illustrating the operation of the embodiment of the sample derivation and distribution circuit shown in FIG. 13.

DETAILED DESCRIPTION OF THE INVENTION

Figure 2B:
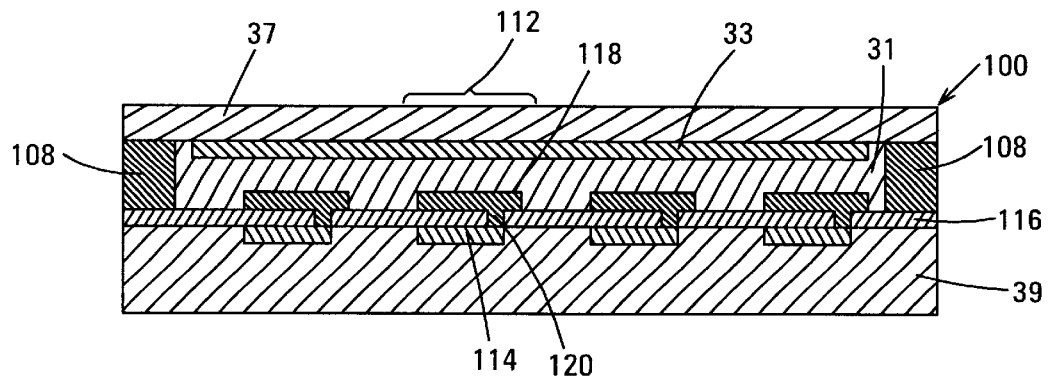

FIG. 1 shows the structure of the display device 10 according to the invention that includes the reflective spatial light modulator 100. Other principal components of the display device are the light source 15, the polarizer 17, the beam splitter 19, the analyzer 21 and the eyepiece 23.

The light source 15 is composed of the LED driver 67 that drives the LEDs 69–71. The LEDs are of different colors and are independently driven in a color display device, as will be described below with reference to FIGS. 15A and 16. Fewer or more LEDs, or other light-emitting devices whose output can be rapidly modulated may alternatively be used as the light source 15. As a further alternative, a white light source and a light modulator may be used. The light modulator modulates the amplitude of the light output by the light source and, in a color display device, additionally modulates the color of the light output.

The light source 15 generates light that passes through the polarizer 17. The beam splitter 19 reflects a fraction of the polarized light from the polarizer towards the spatial light modulator 100. The reflective electrode 35 located on the surface of the substrate 39 of the spatial light modulator reflects a fraction of the incident polarized light. Depending on the electric field across the layer 31 of electro-optical material (the electro-optical layer), to be described below, the direction of polarization of the reflected light is either unchanged or is rotated through 90°. The reflected light passes to the user's eye E through the beam splitter 19, the analyzer 21 and the eyepiece 23.

The eyepiece 23 focuses the light reflected by the reflective electrode 35 at the user's eye E. The eyepiece is shown as a single convex lens in FIG. 1. A more complex optical arrangement may be used to form a low-aberration image of the desired apparent size at the user's eye.

The direction of polarization of the analyzer 21 is aligned parallel to the direction of polarization of the polarizer 17 so that light whose direction of polarization has not been rotated by the spatial light modulator will pass through the analyzer to the user's eye E, and light whose direction of polarization has been rotated through 90° by the spatial light modulator will not pass through the analyzer. Thus, the analyzer prevents light whose direction of polarization has been rotated by the spatial light modulator from reaching the user's eye. Consequently, the spatial light modulator will appear light or dark to the user depending on the applied electric field. When the spatial light modulator appears light, it will be said to be in its ON state, and when the spatial light modulator appears dark, it will be said to be in its OFF state. The direction of polarization of the analyzer can alternatively be arranged orthogonal to that of the polarizer. In this case, the spatial light modulator operates in the opposite sense to that just described. This enables a positive picture to be obtained by illuminating the spatial light modulator during the balance period, to be described below.

The optical arrangement shown in FIG. 1 may also form the basis of a full-size video or graphics display. The inventors have demonstrated such a full-size color display device with a nominal diagonal dimension of 430 mm. This display device was made by increasing the intensity of the light source 15 and by replacing the eyepiece 23 with magnifying optics that form an image of the reflective electrode 35 on a suitable screen. A single spatial light modulator sequentially illuminated by light of the three primary colors, or parallel spatial light modulators, each illuminated by light of a different primary color, can be used in a full-size color display device.

FIG. 1 additionally shows some details of the spatial light modulator 100. The spatial light modulator is composed of the electro-optical layer 31 sandwiched between the common electrode 33 and the reflective electrode 35. The electrode 33 is transparent and is deposited on the surface of the transparent cover 37. The electrode 35 is located on the surface of the semiconductor substrate 39.

An electro-optical material is a material having an optical property that depends on an applied electric field. For example, in the optical arrangement shown in FIG. 1, the rotation of the direction of polarization of light impinging on the electro-optical layer depends on the direction of an electric field applied to the layer. In other electro-optical materials, rotation of the direction of polarization may depend on the strength of the electric field applied to the layer. The transmissivity of other electro-optical materials may depend on the electric field applied to the layer.

Some electro-optical materials have a bistable characteristic. In such materials, the optical property of the material is set by applying a short-duration electrical pulse. The material will keep the optical property set by the electrical pulse until the material is reset by applying a short duration optical pulse in the opposite direction. Bistable electro-optical materials have the advantage that the electrical pulses that drive them can be inherently DC balanced, so an additional balance period, to be described below, need not be provided. This provides a larger luminous efficiency compared with electro-optical materials that require a DC balance period.

In the preferred embodiment, the electro-optical material is a ferroelectric liquid crystal material. The direction of the electric field applied between the transparent electrode 33 and the reflective electrode 35 determines whether the direction of polarization of light impinging on the ferroelectric material sandwiched between the electrodes is rotated or not. In other embodiments, a conventional nematic liquid crystal may be used as the electro-optical material. In this case, the strength of the electric field between the electrodes determines whether the direction of polarization is rotated or not.

To enable the display device 10 to display an image instead of merely controlling the passage of light from the light source 15 to the user's eye E, the reflective electrode 35 is divided into a two-dimensional array of pixel electrodes, exemplary ones of which are shown at 118. In addition, an analog drive circuit according to the invention (114 in FIG. 2A) that drives the pixel electrode is located in the substrate 39 under each pixel electrode. The analog drive circuit, the pixel electrode and the portions of the electro-optical layer 31 and the common electrode 33 overlaying the pixel electrode collectively constitute a pixel, an exemplary one of which is shown at 112.

When the electro-optical layer 31 is composed of a ferroelectric material, the direction of the electric field applied between each pixel electrode, such as the pixel electrode 118, and the common electrode 33 determines whether the direction of polarization of the light reflected by the pixel electrode is rotated through 90° or not, and thus whether the corresponding pixel, such as the pixel 112, will appear bright or dark to the user. When the pixel appears light, the pixel will be said to be in its ON state, and when the pixel appears dark, the pixel will said to be in its OFF state.

The optical characteristics of the pixels of the spatial light modulator 100 are binary: light from the light source 15 and reflected by the pixel either passes through the analyzer 21 to the user's eye E or does not pass through the analyzer to the user's eye. To produce a grey scale, the apparent brightness of each pixel is varied by temporally modulating the light that reaches the user's eye. The light is modulated by choosing a basic time period that will be called the illumination period of the spatial light modulator. The spatial light modulator is illuminated through the illumination period, and each pixel is set to its ON state for a first temporal portion of the illumination period, and to its OFF state for a second temporal portion. The second temporal portion constitutes the remainder of the illumination period, and is thus complementary to the first temporal portion. Alternatively, the OFF state may precede the ON state. The fraction of the illumination period constituted by the first temporal portion, during which the pixel is in its ON state, determines the apparent brightness of the pixel.

To maximize the service life of the spatial light modulator, the DC balance of each pixel must be maintained. Since the time-integral of the electric field applied to a conventional (non-bistable) ferroelectric material during the first temporal portion is rarely equal and opposite to that applied during the second temporal portion, additional measures must be taken to restore the DC balance of the pixel. The DC balance of the pixel is restored by driving the pixel so that the electric field applied to the ferroelectric material of the pixel averages to zero. This is accomplished in practice by driving the pixel electrode so that the first sequence of the first temporal portion and the second temporal portion constituting the illumination period is followed by a second sequence of the first temporal portion and the second temporal portion, the second sequence constituting a balance period. In the first and second temporal portions of the balance period, the state of the drive signal is the same as that during the second and first temporal portions, respectively, of the illumination period. To prevent the balance period following each illumination period from causing the display device 10 to display a uniform, grey image, the light generated by the light source 15 is modulated so that the spatial light modulator 100 is only illuminated during each illumination period and is not illuminated during the following balance period.

The illumination period and the balance period collectively constitute the display period of the spatial light modulator. The display period of a monochrome display may correspond to the frame period or the picture period of the video signal, for example.

As noted above, the drive signal required to drive a bistable electro-optical material during the illumination period can be inherently DC balanced. Consequently, no balance period need be provided, and the duration of the illumination period can be extended from about 50% of the display time to about 100% of the display time.

The principles just described may be extended to enable the spatial light modulator to generate a color image. In this case, the spatial light modulator is driven by the color components of a color video signal, and three display periods are defined for each frame of the color video signal, one for each color component. The light source 15 illuminates the spatial light modulator with light of a different color during the illumination period of each display period.

Each pixel is set to its ON state for a fraction of each of the three illumination periods, and to its OFF state for the remainder of the illumination period. The fraction of each of the three illumination periods in which the pixel is in its ON state determines the apparent saturation and hue of the pixel. The display periods of a color display may each correspond to one-third of the frame period of the color video signal, for example. Making the display period the same for the three color components is operationally convenient, but is not essential.

The spatial light modulator 100 will now be described in more detail with reference to FIGS. 2A–2D. Referring first to FIGS. 2A and 2B, the light modulator is composed of the electro-optical layer 31 sandwiched between the transparent cover 37 and the semiconductor substrate 39. The transparent cover, which may be a thin glass plate, for example, is separated from the substrate by the spacers 108. The translucent common electrode 33, which may be a layer of indium tin oxide (ITO), for example, is located on the inside surface of the transparent cover, facing the substrate.

An array 102 of pixels is located on the surface of the substrate 39. The exemplary pixel is shown at 112. The drawings throughout this disclosure show pixel arrays with only four pixels in each dimension to simplify the drawings. In a practical embodiment, the pixel array would be composed of, for example, 640×480, 800×600 pixels, 1280× 1024 pixels, 2044×1125 pixels, or some other acceptable two-dimensional arrangement of pixels.

For each pixel in the pixel array 102, an analog drive circuit according to the invention is formed by conventional semiconductor processing on and under the surface of the substrate 39. The analog drive circuit of the exemplary pixel 112 is shown at 114. The analog drive circuit is composed of transistors, capacitors and other circuit elements (not shown) interconnected by one or more layers of conductors (not shown). The analog drive circuits of the pixels constituting the pixel array 102 are connected to one another and to pads through which external electrical connections are made by additional layers of conductors (not shown). The surface of the substrate, and the above-mentioned layers of conductors, are covered by the insulating layer 116. The reflective pixel electrode 118 of the pixel 112 is located on the surface of the insulating layer overlaying the analog drive circuit. The pixel electrode is connected to the output of the analog drive circuit 114 by the conductor 120 which passes through an aperture formed in the insulating layer.

In the pixel 112, the analog drive circuit 114 generates a drive signal that is applied to the pixel electrode 118. The drive signal applied to the electrode has a 1 state and a 0 state. The 1 state may be a high voltage state, and the 0 state may be a low voltage state, for example. The state of the drive signal applied to the pixel electrode determines whether or not the portion of the electro-optical layer 31 overlaying the pixel electrode rotates the direction of polarization of light falling on the pixel, as described above. The analog drive circuit sets the apparent brightness of the pixel by applying the drive signal to the pixel electrode in response to an analog sample derived from a video signal. During each above-described illumination period the drive signal starts in one state, corresponding to the ON state of the pixel, for example, and remains there for the first temporal portion. Before the end of the illumination period, the drive signal switches to the other state and remains there for the second temporal portion. The fraction of the illumination period for which the pixel is in its ON state determines the apparent brightness of the pixel. When the video signal is a color video signal, the analog drive circuit sets the apparent saturation and hue of the pixel by applying drive signals that turn the pixel ON for fractions of three consecutive illumination periods that depend on the three color components of the color video signal.

The video signal may be a conventional analog video signal such as is generated by a conventional computer graphics adaptor card, video or television receiver. In the examples to be described below, a conventional analog video signal is shown. However, this is not critical; the video signal may be composed of digital graphics data such as is fed to a computer graphics adaptor or is generated by a digital video or television receiver. In this case, conventional additional circuitry (not shown) is provided to convert the digital graphics data to an analog video signal, or to derive directly from the digital graphics data the analog samples that are distributed to the analog drive circuits of the pixels.

FIG. 2A shows the pixels arranged in the two-dimensional pixel array 102 on the surface of the substrate 39. The sample derivation and distribution circuit 104 is also formed in the substrate 39. This circuit distributes analog samples derived from the video signal received via the video input 106 to the pixel array and generates the various timing and control signals required by the pixel array. Signals are distributed from the sample derivation and distribution circuit to the pixels by busses, representative ones of which are shown schematically at 131 and 133.

Figure 2C:
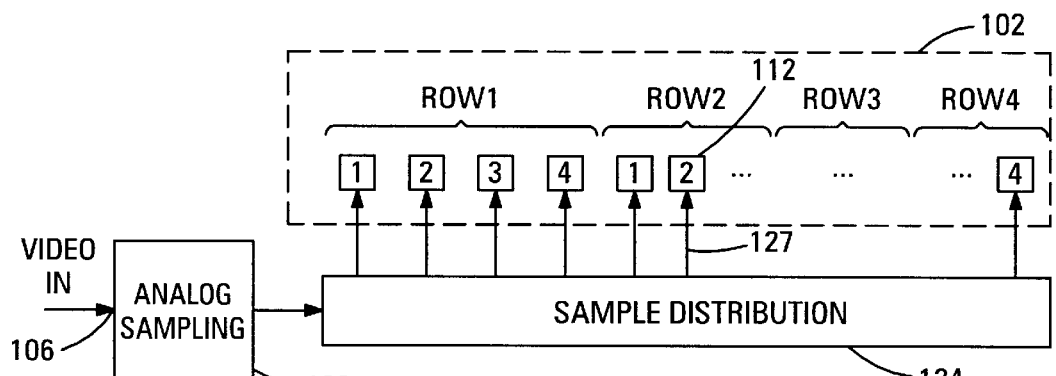

FIG. 2C is schematic representation of the electrical arrangement of the spatial light modulator 100. The analog sampling circuit 122 receives a video signal via the video input 106 and derives a stream of analog samples from the video signal. The analog samples are distributed to the pixels constituting the pixel array 102 by the sample distribution circuit 124. Each pixel receives at least one sample of each frame of the video signal. The location in the frame of the video signal whence the sample is derived corresponds to the location of the pixel in the pixel array, as illustrated in FIGS. 3A–3D.

FIGS. 3A–3C respectively show examples of three consecutive frames of the video signal received via the video input 106. Each frame is shown divided into four lines corresponding to the four rows of the pixel array 102. Each line is shown divided into four segments, corresponding to the four pixels in each row of the pixel array. The analog sample generated by the analog sampling circuit in response to each segment of the video signal is indicated by a short horizontal line. For example, the analog samples derived from the segments $123_1$, $123_2$ and $123_3$, i.e., the second segment of the second line of each frame, are indicated by the horizontal lines $125_1$, $125_2$ and $125_3$, respectively.

The row and column numbers of the pixels in the pixel array 102 to which the sample distribution circuit 124 distributes the analog samples are indicated in FIG. 3D. For example, the exemplary pixel 112 is the second pixel in the second row of the pixel array, and so receives the analog samples $125_1$, $125_2$ and $125_3$ respectively derived from the segments $123_1$, $123_2$ and $123_3$ of the frames. These segments extend from ¼-way along to ½-way along the second line of each frame of the video signal.

Figure 2D:
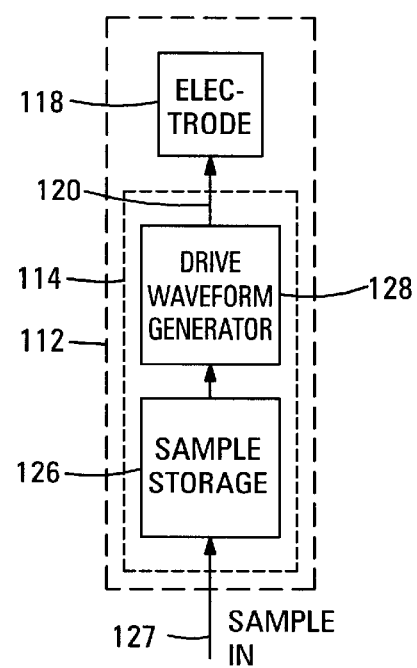

FIG. 2D is a schematic representation of the electrical arrangement of the pixel 112 in the two-dimensional pixel array 102. The remaining pixels have the same electrical arrangement. The pixel is composed of the analog drive circuit 114, the output of which is connected to the electrode 118 by the conductor 120. The analog drive circuit is composed of the sample selection section 126, and the drive signal generator 128. The sample selection section has a sample input 127 connected to the sample distribution circuit 124 (FIG. 2C). During each frame of the video signal, the sample selection section receives an analog sample derived from the video signal via the sample input and temporarily stores the sample until the sample is needed by the drive signal generator 128. FIG. 3E shows the analog samples derived from the three frames of the video signal shown in FIGS. 3A–3C stored in the sample selection section of the pixel 112.

The drive signal generator 128 receives each analog sample stored in the sample selection section 126 during the picture period of the previous frame and, in response to the sample, generates a drive signal and applies the drive signal to the electrode 118. The drive signal generator generates the drive signal with a period corresponding to the above-described display period. FIG. 3F shows an example of the drive signal generated by the analog drive circuit 114 in response to the analog samples shown in FIG. 3E. Each of the display periods of the drive signal is composed of an illumination period and a balance period of equal durations. The drive signal generator additionally generates the drive signal in the 1 state for a first temporal portion 1 TP that constitutes a fraction of each illumination period that is proportional to the voltage level of the corresponding analog sample. This can be seen by comparing the durations of the first temporal portions 1 TP of illumination periods shown in FIG. 3F with the corresponding voltage levels shown in FIG. 3E.

The drive signal is generated so that it remains in the 0 state for the second temporal portion 2 TP constituting the remainder of the illumination period, and also for the first temporal portion 1 TP of the balance period. The first temporal portion of the balance period has a duration equal to the first temporal portion of the illumination period in which the drive signal was in the 1 state. Finally, the drive signal changes to the 1 state for the second temporal portion 2 TP constituting the remainder of the balance period. The duration of the first temporal portion of the drive signal is different in each of the three illumination periods, depending on the voltage level of the respective sample. In each following balance period, the drive signal is in the 1 state for the second temporal portion, and is therefore in the 1 state for a time that is complementary to the duration of the 1 state in the illumination period.

In the example shown in FIG. 3F, the display period of each frame begins immediately after the end of the display period of the previous frame. In some embodiments, such as the embodiment to be described below with reference to FIGS. 4A and 4B, the drive waveform is generated intermittently, and a period in which the drive signal is generated in a neutral state is interposed between consecutive display periods.

The waveforms just described are those required to drive an electro-optical material that lacks a bistable characteristics. However, it will be apparent to a person of ordinary skill in the art that circuits, such as those to be described below, for generating such waveforms can easily be adapted to generate the waveforms required to drive a bistable electro-optical material. For example, an analog drive circuit capable of generating the waveforms just described can be adapted to drive a bistable electro-optical material by capacitatively or a.c. coupling the output of the circuit to the pixel electrode.

Figure 4A:
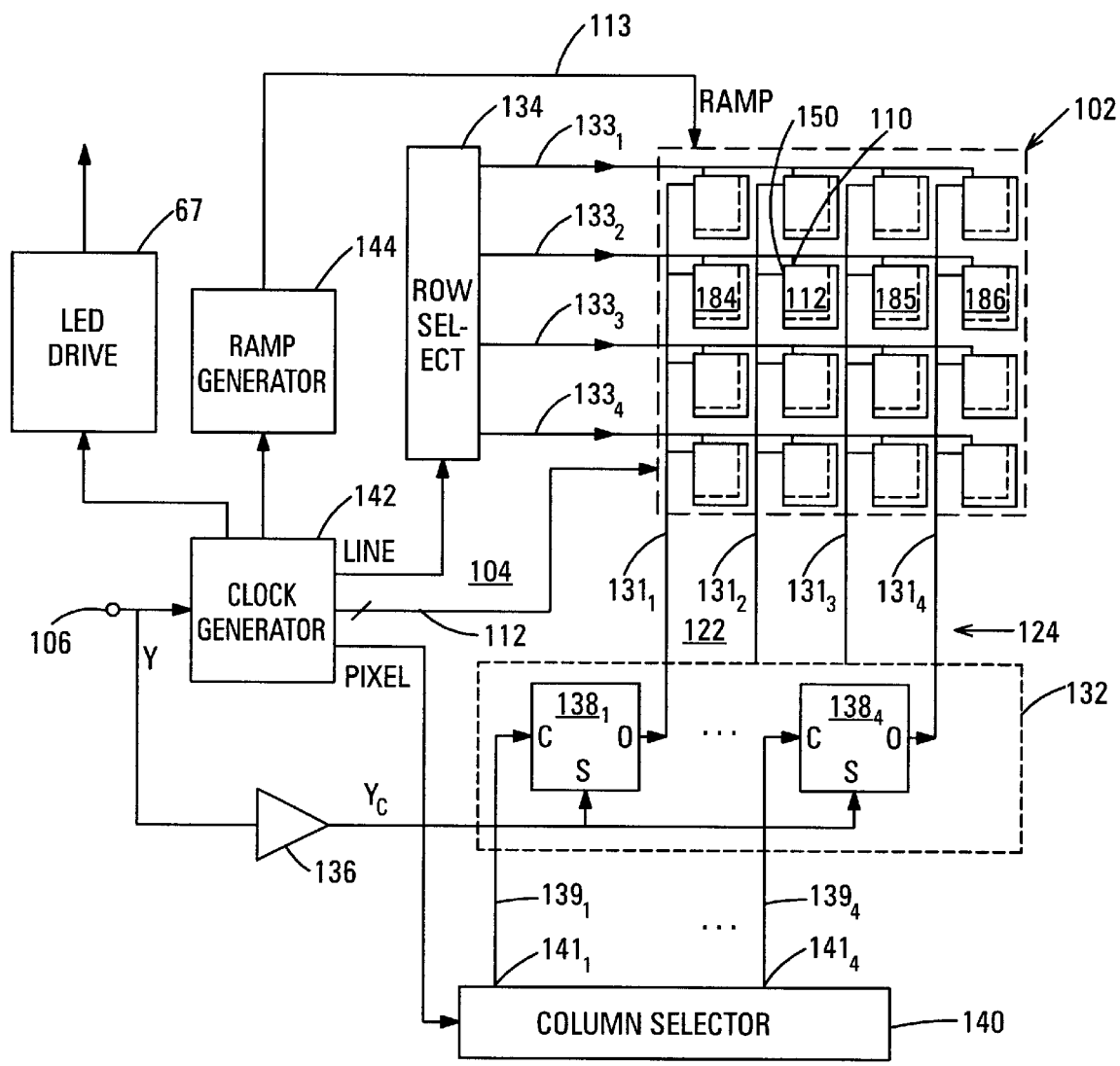
FIG. 4A is a block diagram showing the pixel array and the sample derivation and distribution circuit of a first embodiment of a monochrome display device that incorporates a first embodiment of the analog drive circuit according to the invention.
Figure 4B:
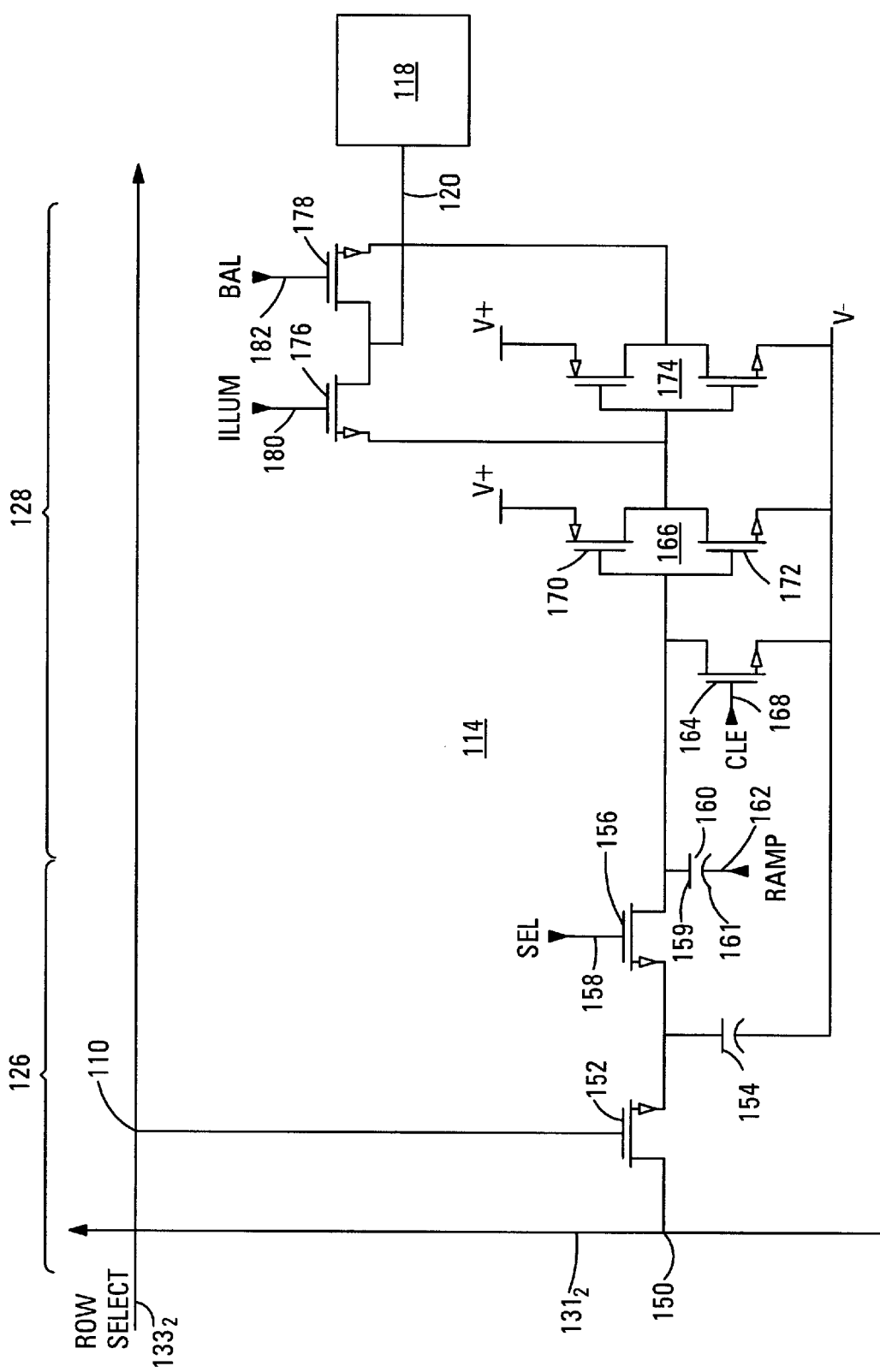
FIG. 4B is a schematic diagram by the first embodiment of the analog drive circuit according to the invention.

FIGS. 4A and 4B show a first practical embodiment of the circuitry of the spatial light modulator 100 in more detail. In particular, FIG. 4A shows in more detail the sample derivation and distribution circuit 104 that derives analog samples from the video signal and distributes the samples to the individual pixels. FIG. 4B shows the analog drive circuit of one of the pixels in detail and will be described below. In this embodiment, sample selection circuits that perform the row-wise distribution function of the sample distribution circuit 124 shown in FIG. 2C reside in the analog drive circuits of the pixels. The analog sampling circuit 122 generates a stream of analog samples for each column of the pixel array 102, and the sample section circuit in each pixel performs the row-wise selection from the analog sample stream.

This embodiment will be described with reference to a monochrome display device based on a highly-simplified 4×4 array of pixels to simplify the drawing and the explanation. A variation that provides a color display device will be described below with reference to FIGS. 15A and 15B.

The analog sampling circuit 122 receives the video signal Y via the video input 106. As will be described in more detail below, the analog drive circuit of each pixel in the pixel array 102 has a sample input and a row select input. For example, the pixel 112 has the sample input 150 and the row select input 110. The analog drive circuit additionally has a ramp input and additional inputs for various timing and control signals (not shown in FIG. 4A). Each analog drive circuit delivers a drive signal to the electrode that overlays it. The sample inputs of all the pixels in each column of the pixel array are connected to a column bus that is in turn connected to a respective output of the analog sampling circuit 132. For example, the sample inputs of the pixels in the second column, where the exemplary pixel 112 is located, are connected to the column bus 131$_2$. The location in each line of the video signal whence the analog samples received by each column of pixels are derived depends on the location of the column in the pixel array, as described above. An analog sample of every line of the video signal is fed to the sample input of each analog drive circuit.

The row select inputs of all the pixels in each row of the pixel array 102 are connected to a row select bus that is driven by a corresponding output of the row selector 134. For example, the row select inputs of the pixels in the second row, where the exemplary pixel 112 is located, are connected to the row select bus 133$_2$. An analog drive circuit can accept an analog sample present at its sample input only when its row select input is the 1 state, for example. The row selector sequentially sets the row select busses to the 1 state at the line rate of the video signal. During the first line of each frame of the video signal, the row selector sets the row select bus 133$_1$ connected to the first row of pixels to the 1 state, and sets the remaining row select busses to the 0 state. The sampling circuit 132 sequentially feeds analog samples of the first line of the video signal to the column busses in order, starting with the column bus 131$_1$ of the first column. The column bus of each column feeds the analog samples to all the pixels in the column, but the analog samples are only accepted by the pixels in the first row.

At the end of the first line of the video signal, row selector 134 sets the row select bus 133$_1$ connected to the first row of pixels to the 0 state, and sets the row select bus 133$_2$ connected to the second row of pixels to the 1 state. When the sampling circuit 132 sequentially feeds analog samples of the second line of the video signal to the column busses, the analog samples are only accepted by the pixels in the second row of pixels. This process is repeated with the row selector 134 sequentially setting the remaining row select busses 133$_3$ and 133$_4$ to the 1 state until each pixel in the pixel array 102 has accepted a different analog sample derived from the frame of the video signal.

The part of the analog sampling circuit 122 that derives analog samples from the video signal and the sample distribution circuit 124 that feeds the analog samples to the sample input of the analog drive circuit of each of the pixels in the pixel array 102 will now be described.

The video signal is fed from the video input 106 to the buffer amplifier 136. In addition to buffering the video signal, the buffer amplifier may additionally change the dynamic range and DC level of the video signal to meet the dynamic range and DC level requirements of the analog drive circuits of the light modulator 100. The video signal $Y_c$ output by the buffer amplifier is fed to the sampling circuit 132. The buffer amplifier may alternatively be omitted.

The sampling circuit 132 is composed of one sample-and-hold (S/H) circuit for each column of the pixel array 102. To simplify the drawing, the S/H circuits other than the S/H circuits 138$_1$ and 138$_4$ have been omitted. Each of the S/H circuits has a signal input S, a control input C and a sample output O. The signal input is connected to receive the video signal $Y_c$ output by the buffer amplifier 136. The control input C is connected via a control line to a corresponding output of the column selector 140. For example, the control input of the S/H circuit 138$_1$ is connected via the control line 139$_1$ to the output 141$_1$, of the column selector. The sample output O of each S/H circuit is connected to the column bus of the respective column of pixels. For example, the output of the S/H circuit 138$_1$ is connected to the column bus 131$_1$ connected to sample inputs of the analog drive circuits of all the pixels in the first column.

The column selector 140 receives the clock signal PIXEL from the clock generator 142. The clock signal PIXEL includes a pixel-rate clock signal and the horizontal sync signal extracted or otherwise derived from the video signal. The clock generator will be described in more detail below. The column selector is composed of a shift register (not shown) having stages equal in number to the number of columns in the pixel array 102. The outputs of the stages of the shift register are connected via control lines in column order to the control inputs of the sampling circuit 132. For example, the output 141$_1$ of the first stage of the shift register is connected via the control line 139$_1$ to the control input of the S/H circuit 138$_1$ of the sampling circuit.

The trailing edge of the horizontal sync signal or the horizontal blanking signal resets the shift register constituting the column selector 140 so that the first stage, whose output 141$_1$ is connected to the control line 139$_1$, is set to its 1 state, and the outputs of all the other stages are set to their 0 states. Then, the clock signal PIXEL progressively shifts the 1 state along the shift register at the pixel rate. As the output of each stage of the shift register changes from 1 to 0, the sample output O of the S/H circuit controlled by the stage is set to a value that represents the level of the video signal connected to the signal input S of the S/H circuit. For example, as the output 141$_1$ of the first stage of the shift register changes from 1 to 0, the sample output of the S/H circuit 138$_1$ is set to a value that represents the level of the video signal during the preceding pixel period. The sample output of the S/H circuit may be set to a value equal to the instantaneous level of the video signal at the time the control input to the S/H circuit changes state, or the peak, or mean, or RMS level of the video signal during the period in which the control input is in its 1 state. Alternatively, the sample output of the S/H circuit may be set to some other level related to the video signal during the time that the control input is in its 1 state, depending on the sampling characteristics of the S/H circuits.

The structure of the row selector 134 is similar to that of the column selector 140. The number of stages in the shift register that constitutes the row selector is equal to the number of rows in the pixel array 102. The row selector receives the clock signal LINE from the clock generator 142. The clock signal LINE includes a line-rate clock signal, and the vertical sync signal extracted from the video signal. The row selector is reset by the trailing edge of the vertical sync signal and is clocked by the line-rate clock signal. Consequently, the row selector successively activates the rows of pixels at the line rate of the video signal.

The clock generator 142 receives the video signal from the video input 106 and generates the various clock and control signals required by the analog sampling circuit 122, the analog drive circuits of the spatial light modulator 100, the ramp generator 144 and the LED driver 67. Suitable clock generators are known in the art and so the clock generator 142 will not be described in detail here. The clock generator feeds the control signals SEL, CLE, ILLUM and BAL via the bus 112 for distribution to the analog drive circuits in the pixel array 102.

As part of its clock and control signal generation, the clock generator 142 extracts the vertical and horizontal sync signals from the video signal. If the video signal lacks such sync signals, the clock generator derives sync signals from such alternative indicia of the start of the frames and lines of the video signal as are included in the video signal or are otherwise available.

The LED driver 67 receives a control signal from the clock generator 142 and drives the LEDs 69–71 (FIG. 1) in response to the control signal to cause the LEDs to illuminate the spatial light modulator 100. The timing relationship between the drive signal applied to the LEDs and the control signals applied to the spatial light modulator will be described below.

For each frame of the video signal, the ramp generator 144 generates two successive ramp signals, each having a duration equal to the illumination period. For example, the ramp generator generates the first ramp signal in response to the trailing edge of the vertical sync pulse, and generates the second ramp signal in response to the end of the first ramp signal. Although the ramp signals are depicted as having linear slopes in the drawings, the slopes of the ramp signals are preferably non-linear since a non-linear slope provides simple and effective gamma correction. Gamma correction is required to correct for the non-linear perception of the apparent brightness of the pixel by the human eye.

A suitable non-linear ramp signal may be generated using a memory. Values that define the level of the ramp signal at times corresponding to each cycle of a clock signal, such as a clock signal obtained by dividing the pixel clock signal, are stored in the memory. The memory is then clocked with the clock signal, and the successive values read out from the memory are converted to an analog ramp signal. Other techniques for generating a suitable non-linear ramp signal by digital or analog means are known in the art. The ramp generator feeds the ramp signals via the bus 113 to the pixel array 102 for distribution to the analog drive circuits of the pixels in the array.

The ramp signals generated by the ramp generator 144 are shown in FIG. 7D and 11J below as beginning in a low state and increasing towards a high state. However, this is not critical. The ramp signals may begin in a high state and decrease towards a low state. Moreover, the ramp signal may begin in the low state and increase towards the high state during the illumination period and may then decrease towards the low state in the following balance period, or vice versa.

A first embodiment of the analog drive circuit according to the invention of each of the pixels of the pixel array 102 is shown in FIG. 4B. The analog drive circuits will be described with reference to the exemplary analog drive circuit 114 of the exemplary pixel 112 shown in FIG. 4A. This pixel is the second pixel of the second row of the pixel array. The analog drive circuits of the other pixels of the pixel array are identical, but each is connected to a different combination of column bus and row selector bus.

During each frame of the video signal, the analog drive circuit 114 receives an analog sample derived from the video signal, generates a drive signal in response to the analog sample and applies the drive signal to the pixel electrode 118.

This embodiment of the analog drive circuit 114 can be regarded as being composed of the sample selection section 126 and the drive signal generator 128. The sample selection section selects the analog sample for the pixel from among the analog samples on the column bus $131_2$ and stores the analog sample. The drive signal generator generates the drive signal and applies the drive signal to the pixel electrode 118.

The sample selection section 126 will now be described. The sample selection section selects and stores the analog samples of the video signal that are to be displayed by the pixel 112 from the analog samples placed on the column bus $131_2$ by the sampling circuit 132. The sample selection section also feeds the stored analog samples to the drive signal generator 128.

The sample input 150 of the analog drive circuit 114 is connected to the column bus $131_2$. Also connected to the sample input is the drain of the sample select transistor 152. The gate of the sample select transistor is connected via the row select input 110 to the row select bus $133_2$ connected to all the pixels located in the second row of the pixel array. The source of the sample select transistor is connected to one electrode of the sample storage capacitor 154. The other electrode of the sample storage capacitor is connected to a constant voltage source, e.g., ground.

The node between the sample storage capacitor 154 and the sample select transistor 152 is connected to the source of the sample output transistor 156. The gate of the sample output transistor is connected to the sample output control signal SEL generated by the clock generator 142 and distributed by the sample output bus 158 to the gates of the sample output transistors of the analog drive circuits of all the pixels constituting the pixel array 102.

The drive signal generator 128 will now be described. The drain of the sample output transistor 156 is connected to the electrode 159 of the ramp capacitor 160. The electrode 161 of the ramp capacitor is connected to the RAMP signal generated by the ramp generator 144 (FIG. 4A) and distributed by the ramp bus 162 to the ramp capacitors of the analog drive circuits of all the pixels constituting the pixel array 102.

The electrode 159 of the ramp capacitor 160 is also connected to the drain of the reset transistor 164 and the input of the inverter 166. The source of the reset transistor is connected to a constant voltage source, e.g., ground. The gate of the reset transistor is connected to the reset control signal CLE generated by the clock generator 142 and distributed by the reset bus 168 to the gates of the reset transistors of the analog drive circuits of all the pixels constituting the pixel array 102.

The inverter 166 is composed of the PMOS transistor 170 and the NMOS transistor 172, the gates of which are connected to one another and to the input of the inverter, the drains of which are connected to one another and to the output of the inverter, and the sources of which are respectively connected to high and low constant voltage levels V+ and V−. These constant voltage levels may be, for example, the positive power supply and ground, respectively.

The output of the inverter 166 is connected to the input of the inverter 174 and to the source of the illumination selector transistor 176. The structure of the inverter 174 is identical to the inverter 166 and so will not be described. The output of the inverter 174 is connected to the source of the balance selector transistor 178. The drains of the selector transistors 176 and 178 are connected to one another and, by the conductor 120, to the electrode 118. The gates of the selector transistors 176 and 178 are respectively connected to the ILLUM control signal and the BAL control signal. The ILLUM and BAL control signals are generated by the clock generator 142 and are distributed by the busses 180 and 182, respectively, to the gates of the selector transistors of the analog drive circuits of all the pixels constituting the pixel array 102.

The common electrode 33 shown in FIG. 2B is connected to the constant voltage source V+/2 approximately mid-way between the high and low constant-voltage sources.

Operation of the just-described embodiment of the spatial light modulator 100 according to the invention will now be described with reference to FIGS. 4A and 4B, and the timing diagrams shown in FIGS. 5A–5D, and 6A–6R and 7A–7G.

FIG. 5A shows the basic operation of the above-described embodiment of the spatial light modulator in which analog samples of frame 1 are loaded during the picture period of frame 1, and a display operation is performed in response to the analog samples of frame 1 during the picture period of frame 2. The frames of the video signal are each divided into a vertical blanking period VB and a picture period. During the picture period of frame 1, an analog sample derived from frame 1 of the video signal is loaded into the sample storage capacitor 154 of the analog drive circuit of each pixel in the pixel array 102. This process will be described below with reference to FIGS. 6A–6R. Simultaneously, a display operation is performed in response to the analog samples of the previous frame 0. During the vertical blanking period of frame 2, the analog sample of frame 1 stored in the sample storage capacitor of each pixel is transferred to the ramp capacitor of the pixel. Then, during the picture period of frame 2, a display operation is performed in response to the analog sample transferred to the ramp capacitor of each pixel in the pixel array. Simultaneously, an analog sample of frame 2 is loaded into the sample storage capacitor of the pixel.

The waveform ILED of the current supplied to the LEDs 69–71 by the LED driver 67 is schematically shown in FIG. 5B. During each illumination period, the LED driver 67 feeds current to the LEDs 69–71 to cause the LEDs to illuminate the spatial light modulator 100. During the balance period following the illumination period and the vertical blanking period preceding the illumination period, the LED driver turns the LEDs OFF. During the illumination period, the analog drive circuits of all the pixels constituting the pixel array 102 simultaneously generate the illumination sequence of the drive signal that they apply to their respective pixel electrodes to cause the pixel to modulate the intensity of the light reflected by the pixel. During each balance period, in which the spatial light modulator is not illuminated, the analog drive circuits of all the pixels simultaneously generate the balance sequence of the drive signal.

The balance sequence of the drive signal is complementary to the illumination sequence of the drive signal and restores the DC balance of the pixel. The drive signal will be further described below with reference to FIGS. 7A–7G.

The ILLUM and BAL control signals are shown in FIGS. 5C and 5D, respectively. During the vertical blanking period at the beginning of each frame period, the clock generator 142 generates both of these control signals in their 0 state. Accordingly, both the selector transistors 176 and 178 are OFF, and the voltage on the pixel electrode 118 is approximately equal to the voltage on the common electrode 33 (FIG. 2B). The clock generator 142 generates the ILLUM control signal in the 1 state whenever the LED driver 67 supplies current to the LEDs 69–71. The ILLUM control signal turns the illumination selector transistor 176 ON, which connects the electrode 118 to the output of the inverter 166. During the following blanking period, the LED driver supplies no current to the LEDs, and the clock generator generates the BAL control signal shown in FIG. 5D in its 1 state. This turns the balance selector transistor 178 ON, which connects the electrode 118 to the output of the inverter 174.

The process by which an analog sample of the frame of the video signal is loaded into the sample storage capacitor 154 of the analog drive circuit of each pixel in the pixel array 102 will now be described below with reference to FIGS. 4A, 4B and 6A–6R. FIGS. 6A–6D respectively show the control signal waveforms on the control lines $139_1$–$139_4$ connected to the control inputs of the S/H circuits $138_1$–$138_4$ during the picture period of one frame of the video signal. FIG. 6E shows an example of the waveform of the video signal $Y_c$ fed from the buffer amplifier 136 to the signal inputs of the S/H circuits $138_1$–$138_4$. FIGS. 6F–6I respectively show the sample outputs of the S/H circuits $138_1$–$138_4$ fed to the column busses $131_1$–$131_4$, respectively. In particular, FIG. 6G shows the sample waveform on the column bus $131_2$ connected to the sample input 150 of the analog drive circuit 114 of the pixel 112. Sampling begins when the control signal on the control line $139_2$ goes to its 1 state. When the control signal is in this state the output of the S/H circuit $138_2$ connected to the column bus $131_2$ follows the waveform of the conditioned video signal shown in FIG. 6E. When the control signal on the control line $139_2$ returns to its 0 state, the S/H circuit $138_2$ holds the level on the column bus $131_2$ at the level of the conditioned video signal at the transition of the control signal. The level on the column bus remains at this level until the next time the control signal on the control line $139_2$ goes to its 1 state ¼-way along the next line of the conditioned video signal.

FIGS. 6J–6M show the control signals $133_1$–$133_4$ on the row select busses $133_1$–$133_4$, respectively. Each of the control signals is shown as being in its 1 state for the duration of one line of the video signal, and is in its 0 state for the rest of the frame. However, the row select control signals may switch to their 1 states at a time later than the start of their respective lines.

FIGS. 6O–6R respectively show the waveforms V184, V112, V185 and V186 on the sample storage capacitors of the analog drive circuits of the pixels 184, 112, 185 and 186, respectively in the second row of the pixel array 102. Analog samples of the second line of the video signal are accepted by these pixels. During the second line of the video signal, the control signal on the row select bus $133_2$ connected to the pixel 112 is in the 1 state. The control signal turns the sample select transistor 152 ON, which connects the sample storage capacitor 154 to the sample input 150. As a result, the voltage on the sample storage capacitor first changes to the voltage on the column bus $131_2$, then follows the voltage on the column bus, and finally reaches a constant voltage when the output of the S/H circuit driving the column bus goes into its "hold" mode.

In particular, as shown in FIG. 6P, when the control signal on the row select bus $133_2$ changes to its 1 state at the beginning of the second line, the voltage on the sample storage capacitor 154 of the analog drive circuit 114 changes to the level on the column bus $131_2$. The voltage on the sample storage capacitor then follows the voltage changes, shown in FIG. 6G, on the column bus $131_2$. These voltage changes occur as a result of the S/H circuit $138_2$ sampling the second quarter of the second line of the conditioned video signal. Finally, the voltage on the sample storage capacitor reaches a constant level corresponding to the level held by the output of the S/H circuit $138_2$ at the end of the second quarter of the second line. The voltage on the sample storage capacitor reaches this condition at the time of the falling edge of the control waveform shown in FIG. 6B.

FIGS. 6O, 6Q and 6R show how the voltages on the sample storage capacitors of the pixels 184–186 in the second row of the array follow the changes in the voltage on the column busses $131_1$, $131_3$ and $131_4$, respectively, when the control signal on the row selector bus $133_2$ (shown in FIG. 6K) is in its 1 state, and remain constant during the other three lines of the frame.

At the end of the second line of the video signal, the control signal on the row selector bus $133_2$ changes from the 1 state to the 0 state. In this state, the control signal on the row selector bus turns the sample select transistor 152 OFF, which disconnects the sample storage capacitor 154 from the sample input 150. As a result, the voltage on the sample storage capacitor remains fixed at the level it had when the control signal on the row selector bus changed state, as shown in FIG. 6P. The voltages on the sample storage capacitors in the pixels 184–186 in the second row of the array also become fixed when the control signal on the row selector bus $133_2$ reverts to the 0 state.

During the other three lines of the video signal, the control signal on the one of the row select busses $133_1$, $133_3$ and $133_4$ corresponding to the line of the video signal received at the video input changes to the 1 state. As a result, the voltages on the sample storage capacitors of the pixels in the corresponding row of the pixel array follow the voltage levels appearing on the column busses $131_1$–$131_4$. At the end of each line of the video signal, the control signal on the one of the row select busses $133_1$–$133_4$ connected to the corresponding row of the pixel array reverts to the 0 state. This causes the voltages stored in the sample storage capacitors of the pixels in the row to remain fixed until the corresponding line of the next frame.

The processes by which the drive signal generator 128 of each analog drive circuit converts the analog sample stored in the sample storage capacitor 154 into a drive signal will now be described with reference to FIGS. 7A–7G and FIG. 4B. The drive signal has a 1 state duration that depends on the value of the analog sample and subsequently restores the DC balance of the pixel. FIGS. 7A–7G show the events that occur during the vertical blanking period and the illumination period and the balance period constituting the frame 1 display period shown in FIG. 5A, but with a different time scale from that of FIGS. 5A–5D.

FIG. 7A schematically shows the waveform ILED of the current through the LEDs 69–71. During the vertical blanking period prior to the illumination period, no current flows through the LEDs, as shown in FIG. 7A, the output V ramp of the ramp generator is in its minimum state, as shown in FIG. 7D, and both the ILLUM and BAL signals are in their 0 states, so both selector transistors 176 and 178 are OFF. Consequently, the voltage on the pixel electrode 118 is approximately equal to that on the common electrode 33 (FIG. 2B). At the start of the vertical blanking period VB, the reset signal RESET shown in FIG. 7B briefly turns the reset transistor 164 ON. The reset transistor discharges the analog sample of frame 0 from the ramp capacitor 160, as shown at 187 in FIG. 7E. The ramp capacitor is now ready to receive charge from the sample storage capacitor.

After the reset transistor 164 has turned OFF, the output select control signal SEL shown in FIG. 7C switches the sample output transistor 156 ON. This connects the sample storage capacitor 154 in parallel with the ramp capacitor 160, which is in a discharged state. Charge sharing occurs, and the voltage V160 on the ramp capacitor rapidly increases, as shown at 188 in FIG. 7E. The voltage level to which the voltage on the ramp capacitor rises is proportional to the charge in the sample storage capacitor before it was connected to the ramp capacitor. The output select control signal SEL switches the sample output transistor OFF at or before the end of the vertical blanking period, as shown in FIG. 7C. This isolates the ramp capacitor from the sample storage capacitor.

Notwithstanding the increased voltage on the ramp capacitor as a result of the charge sharing, the voltage on the electrode 159 of the ramp capacitor 160 is below the threshold voltage of the inverter 166 at the end of the vertical blanking period. The threshold voltage is indicated by the line 189 in FIG. 7E. As a result, the output voltage Vinv of the inverter 166 continues in its high state, as shown in FIG. 7F. However, since the pixel electrode 118 is disconnected from the outputs of both inverters 166 and 174, the voltage Vpix on the pixel electrode 118 is approximately equal to that applied to the common electrode 33, as shown in FIG. 7G.

The illumination period starts at the end of the vertical blanking period VB. In response to the trailing edge of the vertical sync pulse marking the start of the illumination period, the clock generator 142 causes the LED driver 67 to feed current through the LEDs 69–71 as shown in FIG. 7A, sets the ILLUM control signal to the its 1 state, and triggers the ramp generator 144 to start generating the ramp waveform shown in FIG. 7D.

The ILLUM control signal, shown in FIG. 5C, turns the illumination select transistor 176 ON, which connects the electrode 118 to the output of the inverter 166. This sets the voltage on the electrode to the voltage on the output of the inverter 166 shown in FIG. 7F, i.e., to the 1 state shown in FIG. 7G, and marks the start of the first temporal portion of the illumination period. The BAL control signal, shown in FIG. 5D, keeps the balance select transistor OFF.

The ramp signal generated by the ramp generator 144 is applied to the electrode 161 of the ramp capacitor 160. As the first temporal portion progresses, the ramp signal causes the voltage on the electrode 159 of the ramp capacitor to increase in step with the ramp signal, as shown at 190 in FIG. 7D. At the point 191, the voltage on the electrode 159 of the ramp capacitor reaches the threshold voltage of the inverter 166, and the output of the inverter changes to the 0 state, as shown at 192 in FIG. 7F. Since the pixel electrode 118 is connected to the output of the inverter by the illumination select transistor 176, the voltage on the electrode also changes to the low state, as shown in FIG. 7G. This marks the end of the first temporal portion and the beginning of the second temporal portion of the illumination period. The pixel electrode remains in the 0 state for the second temporal portion constituting the remainder of the illumination period shown in FIG. 7A.

At the end of the illumination period, ramp signal resets, as shown in FIG. 7D, and the voltage on the electrode 159 of the ramp capacitor falls quickly to a level below the threshold voltage of the inverter 166. This causes the output of the inverter 166 to revert to its 1 state, as shown at 193 in FIG. 7F. In addition, both the ILLUM control signal and the BAL control signal change state, as shown in FIGS. 5C and 5D, respectively. This turns the illumination selector transistor 176 OFF and the balance selector transistor 178 ON, which transfers the connection to the pixel electrode 118 from the output of the inverter 166 to the output of the inverter 174. The output of the inverter 174 is in the 0 state when the output of the inverter 166 is in the 1 state. Accordingly, during the first temporal portion of the balance period, the pixel electrode remains in the 0 state as shown in FIG. 7G.

When the level of the electrode 159 of the ramp capacitor reaches the threshold voltage 188 of the inverter 166 once more, the outputs of the inverter 166 changes state, as shown at 194 in FIG. 7F. The output of the inverter 174 also changes state, as a result of which, the voltage on the pixel electrode 118 changes from the 0 state to the 1 state, as shown in FIG. 7G. This marks the end of the first temporal portion and the beginning of the second temporal portion of the balance period. The voltage on the pixel electrode remains in the 1 state for the second temporal portion that constitutes the remainder of the balance period shown in FIG. 7A.

The ramp waveform returns to its minimum state at the end of the balance period, and the reset signal shown in FIG. 7B once more turns the reset transistor 164 ON to discharge the analog sample of frame 1. The BAL control signal returns to its 0 state and the ILLUM control signal remains in its 0 state, as shown in FIG. 5C and 5D at the end of the balance period. The change in the state of the BAL control signal isolates the pixel electrode 118 from the inverters once more, as shown in FIG. 7G.

During the balance period, the drive signal has is in its 1 state for the second temporal portion that is complementary to the first temporal portion in which the drive signal applied to the pixel electrode was in its 1 state during the illumination period when the spatial light modulator was illuminated. Consequently, the voltage on the pixel electrode 118 is set to the 1 state and to the 0 state for equal portions of the display period so that the DC balance of the pixel is maintained.

The duration of the first temporal portion of the illumination period in which the pixel electrode 118 remains in the 1 state depends on the initial voltage to which the ramp capacitor 160 was charged by charge sharing with the sample storage capacitor 154. The DC level and dynamic range of the video signal $Y_c$ generated by the buffer amplifier 136, the voltage range of the ramp signal, and the threshold voltage of the inverter 166 are set so that the inverter 166 changes state almost immediately when the voltage of the analog sample stored in the sample storage capacitor corresponds to the maximum of the dynamic range of the video signal. On the other hand, the inverter does not change state until the end of the illumination period when the sample voltage is at the minimum of the dynamic range of the video signal.

The broken lines 196 and 197 in FIGS. 7F and 7G indicate the longer duration of the 1 states of the output of the inverter 166 and the pixel electrode 118, respectively, when the level of the analog sample is lower, as indicated by the broken line 195 in FIG. 7E. The equally-longer duration of the 0 state of the pixel electrode in the following balance period is indicated by the broken line 198 in FIG. 7G.

In the above-described embodiment of the analog drive circuit, and in the embodiments to be described below, the stages that drive the pixel electrode are required to change state only twice per frame of the video signal. As a result, the analog drive circuit has a lower power consumption than a digital drive circuit of comparable performance. Moreover, the performance of the display device with analog drive circuits is less dependent on the switching speed of the electro-optical material than a display using digital drive circuits.

In the analog drive circuit just described, the transfer relationship between the duration of the first temporal portion of the drive signal applied to the pixel electrode 118 during the illumination period and the analog sample stored in the sample storage capacitor 154 depends on the threshold voltage of the inverter 166. The threshold voltage is process-dependent, and can differ between wafers, between pixel arrays on the same wafer, and between the analog drive circuits in the same pixel array. With current processing technology, these threshold voltage variations limit the grey-scale resolution of the spatial light modulator 100 to about four bits. Most graphics and video applications require a larger grey-scale resolution than this.

Figure 8:
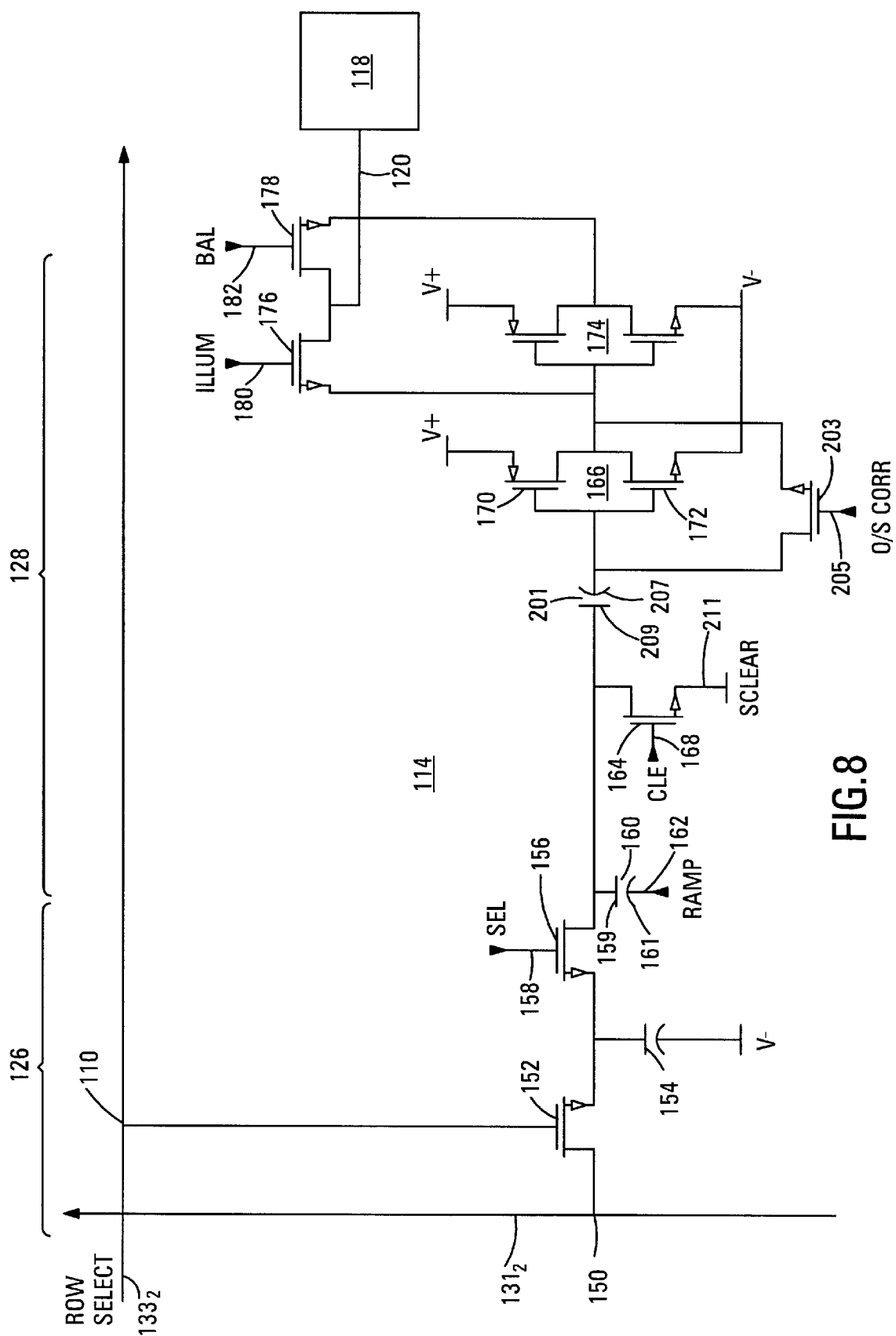
FIG. 8 is a schematic diagram of a variation on the first embodiment of the analog drive circuit according to the invention that incorporates circuitry that minimizes variations in the effective offset of the drive signal generator.

FIG. 8 shows a second embodiment of an analog drive circuit that reduces the effect of threshold voltage variations, and that can therefore provide a greater grey scale resolution. In the embodiment shown in FIG. 8, elements that correspond to those of the embodiment shown in FIG. 4B are indicated by the same reference numerals, and will not be described again here. The sample derivation and distribution circuit that provides analog samples and control signals to the embodiment shown in FIG. 8 is similar to that shown in FIG. 4A, and so will not be described again here.

In the embodiment of the analog drive circuit shown in FIG. 8, the sample selection section 126 is the same as that of the embodiment shown in FIG. 4B. In the drive signal generator 128, the input of the inverter 166 is connected to the electrode 159 of the ramp capacitor 160 by the coupling capacitor 201. The drive signal generator additionally includes the offset correction transistor 203 whose drain and source are connected to the input and output, respectively, of the inverter 166. The gate of the offset correction transistor is connected to the offset correction control signal O/S CORR. The offset correction control signal is generated by the clock generator 142 and is distributed by the bus 205 to the gates of the offset correction transistors of the analog drive circuits of all the pixels constituting the pixel array 102.

Finally, the source of the reset transistor 164 is connected to the reference signal SCLEAR. This reference signal is generated by the clock generator 142 and is distributed by the bus 211 to the sources of the reset transistors of the analog drive circuits of all the pixels constituting the pixel array 102. As shown in FIG. 9C, the reference signal SCLEAR has two states, a high state $V_{REF}$ equal to the desired threshold voltage of the inverter 166 and a low state close to the low voltage level V−. In one practical embodiment, the high state of the reference signal SCLEAR was half-way between high and low voltages V+ and V−.

Operation of the embodiment shown in FIG. 8 is similar to that of the embodiment shown in FIG. 4B. However, at the beginning of the vertical blanking period VB of each frame, the control signal CLE the offset correction control signal O/S CORR are asserted as shown in FIGS. 9A and 9B, respectively. In addition, the reference signal SCLEAR switches to its high state $V_{REF}$ at the beginning of the vertical blanking period, as shown in FIG. 9C. The offset correction control signal turns ON the offset correction transistor 203, which interconnects the input and output of the inverter 166. Connecting the output of the inverter to its input sets the voltage on the input of the inverter, and the voltage on the electrode 207 of the coupling capacitor 201, precisely to the threshold voltage of the inverter. The clear control signal CLE turns the reset transistor 164 ON. The reset transistor connects the electrode 209 of the coupling capacitor 201 to the reference signal SCLEAR in its high state. The reset transistor and the offset correction transistor together set the voltage across the coupling capacitor 201 to a value equal to the difference between the actual threshold voltage of the inverter and the desired threshold voltage $V_{REF}$.

Part-way through the vertical blanking period VB, the control signal O/S CORR is de-asserted, as shown in FIG. 9B. This turns the offset correction transistor 203 OFF, but the voltage across the coupling capacitor 201 remains. Simultaneously, or slightly later, the reference signal SCLEAR switches to its low state V−, as shown in FIG. 9C. Since the control signal CLE is still asserted and the reset transistor 164 is still ON, the ramp capacitor 160 discharges to a low voltage state through the reset transistor. After a time sufficient for the ramp capacitor to discharge fully, the control signal CLE is de-asserted and the reset transistor 164 turns off.

After the reset transistor 164 has turned off, the control signal SEL is asserted, as shown in FIG. 9D. This turns the selector transistor 156 ON. Charge sharing between the sample storage capacitor 154 and the ramp capacitor 160 takes place as described above with reference to FIG. 7E. The control signal SEL is de-asserted before the end of the vertical blanking period VB to isolate the ramp capacitor from the sample storage capacitor.

Operation of the drive signal generating section during the illumination and balance periods constituting the display period is the same as that described above with reference to FIGS. 7E–7G. When the ramp voltage is applied to the electrode 161 of the ramp capacitor, the inverter 166 will change state when the voltage on the electrode 159 of the ramp capacitor reaches a voltage equal to the high state $V_{REF}$ of the reference signal SCLEAR, irrespective of actual threshold voltage of the inverter 166. The same will be true for the inverters 166 of the analog drive circuits of all the pixels in the pixel array 102. This greater consistency in the effective threshold voltage of the inverter 166 increases the grey scale resolution of this embodiment of the spatial light modulator according to the invention to greater than eight bits.

The embodiment of the analog drive circuit just described with reference to FIG. 8 includes three capacitors. The area of silicon occupied by these capacitors using present-day fabrication techniques represents a majority of the area of each analog drive circuit, and limits the number of pixels that can be provided on a die of a given size. Also, the spatial light modulator is illuminated for a total of one half of the picture period of the video signal. Since the vertical blanking period is about 8% of the frame period, the illumination efficiency is about 46%. It would be advantageous to increase the illumination efficiency of the spatial light modulator to the theoretical maximum of 50% and to reduce the number of capacitors to two per analog drive circuit.

A second embodiment 214 of the analog drive circuit according to the invention will be described next with reference to FIGS. 10A and 10B. This embodiment performs simultaneous sample loading and display operations, enabling an illumination efficiency of 50% to be achieved, while requiring only two capacitors per analog drive circuit. The number of capacitors is reduced by eliminating capacitors from the drive signal generator, and by adopting a solution to the inverter offset problem that does not require an additional capacitor. Consequently, this embodiment can form part of a spatial light modulator having a greater number of pixels on a given die size than the embodiments shown in FIGS. 4B and 8.

Figure 10A:
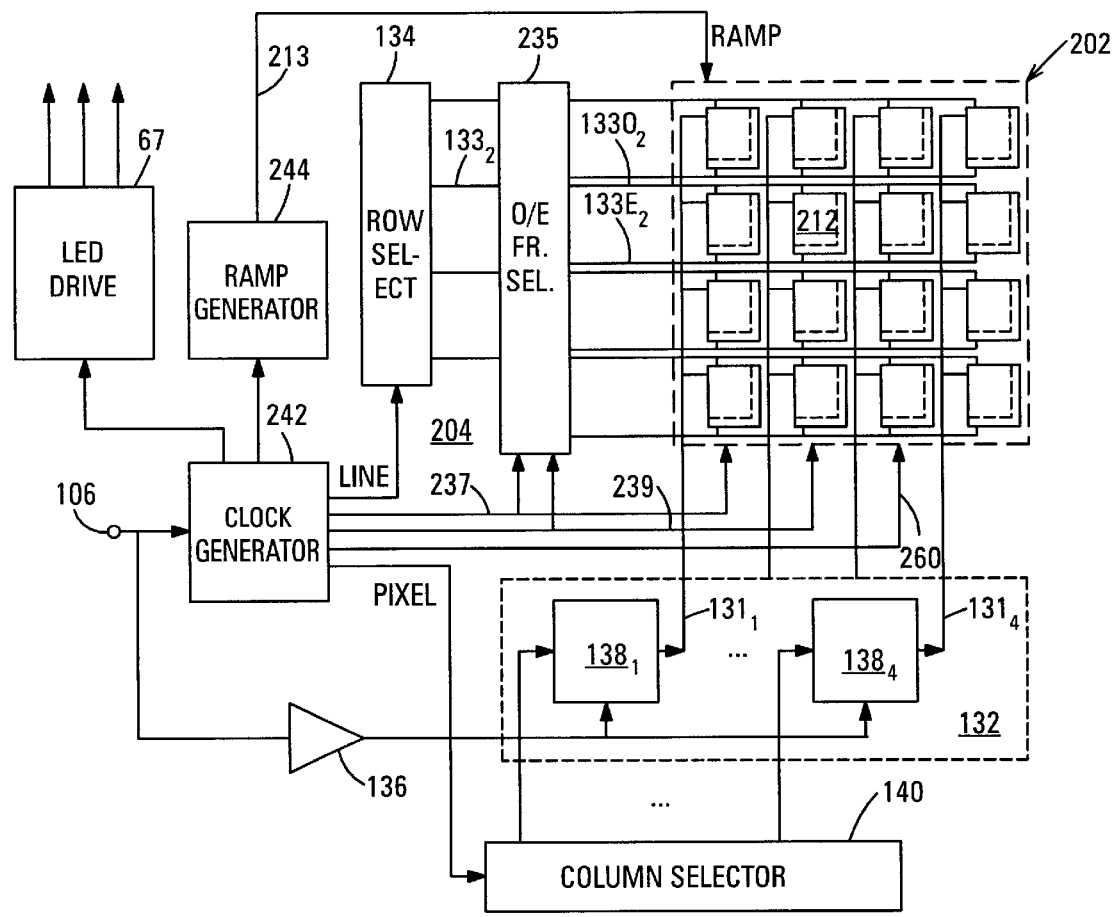
FIG. 10A is a block diagram showing the pixel array and the sample derivation and distribution circuit of a second embodiment of a monochrome display device that incorporates a second embodiment of the analog drive circuit according to the invention.

FIG. 10A shows the sample derivation and distribution circuit 204 that derives analog samples from the video signal received via the video input 106 and feeds the analog samples to the analog drive circuits of the pixels constituting the pixel array. This circuit additionally generates the control signals that control the analog drive circuits. Elements of the sample derivation and distribution circuit 204 that correspond to the sample derivation and distribution circuit 104 shown in FIG. 4A are indicated by the same reference numerals and will not be described. Elements that are similar are indicated by the same reference numeral with 100 added. The sample derivation and distribution circuit differs from that shown in FIG. 4A mainly in the interposition of the odd/even frame selector 235 between the row selector 134 and the pixel array 202, and the provision of an odd-frame selection bus and an even-frame selection bus for each row of pixels in the pixel array.

As will be described in more detail below with reference to FIG. 10B, the analog drive circuit 214 of the exemplary pixel 212 in the pixel array 202 has a sample input, odd-frame and even-frame row select inputs, a ramp input, odd and even sample select inputs, and a comparator sense control input. The analog drive circuit delivers a drive signal to the pixel electrode 218 that overlays it. The remaining pixels constituting the pixel array are similar. The sample inputs of all the pixels in each column of the pixel array are connected to a respective column bus which is connected a respective output of the sampling circuit 132. For example, the sample inputs of the pixels in the first column of the pixel array are connected to the column bus $131_1$. The location in each line of the video signal from which the analog sample received by each column of pixels is derived depends on the row position of the column in the pixel array 202.

The odd-frame row select inputs of all the pixels in each row of the pixel array 202 are connected to a respective odd-frame row select bus, and the even-frame row select inputs of all the pixels in each row of the pixel array are connected to a respective even-frame row select bus. For example, the odd-frame row select inputs of the pixels in the second row of the pixel array in which the pixel 212 is located are connected to the odd-frame row select bus $133O_2$ and the even-frame row select inputs of the pixels in the second row are connected to the even-frame row select bus $133E_2$.

The odd- and even-frame row select busses are connected to respective outputs of the odd/even frame selector 235. The odd/even frame selector has one input and two outputs corresponding to each row of the pixel array 202. A row select bus connects each output of the row selector 134 to a corresponding input of the odd/even frame selector. For example, the row select bus $133_2$ connects the second output of the row selector to the input of the odd/even frame selector corresponding to the outputs connected to the odd- and even frame row select busses $133O_2$ and $133E_2$. An analog drive circuit can accept an analog sample of the video signal present at its sample input only when one of its row select inputs is the 1 state, for example. At the beginning of each frame of the video signal, the row selector 134 sets the row select bus 133₁ to the 1 state and sets the remaining row select busses to the 0 state. Consequently, when the analog samples of the first line of each frame of the video signal are received, these analog samples can be received by the pixels in the first row.

The odd/even frame selector 235 is composed of a pair of two-input gates for each row of pixels. The output of one of the gates constituting each pair is connected to the odd-frame select bus 133O$_n$ of the row and the output of the other of the gates is connected to the even-frame select bus 133E$_n$ of the row, where n is the row number. A first input of each of the gates constituting the pair is connected to the row select bus 133$_n$ corresponding to the row of pixels. The second input of one of the gates is connected to the odd-frame control signal received via the odd-frame control bus 237. The other input of the other of the gates is connected to the even-frame control signal received via the even-frame control bus 239. The odd-frame and even-frame control signals are generated by the clock generator 242. The odd-frame control signal is in the 1 state, for example, during odd-numbered frames of the video signal, and is in the 0 state during even-numbered frames. The even-frame control signal is the inverse of the odd-frame control signal.

With the arrangement just described, the odd/even frame selector 235 maintains in the 0 state the odd- and even-frame row select busses of all rows except the row whose row select input is in the 1 state. The states of odd-frame row select bus and the even-frame row select bus of the row whose row select input is in the 1 state follow the state of the odd-frame control signal and the even-frame control signal, respectively. In other words, the odd-frame row select bus is in the 1 state only when the odd-frame control signal is in the 1 state, and the even-frame row select bus is in the 1 state only when the even-frame control signal is in the 1 state. This enables analog samples of the video signal to be fed to the analog drive circuits in a similar way to that described above with reference to FIG. 4B. However, the odd- and even-frame row select busses cause analog samples of odd frames and even frames of the video signal to be stored in the odd-frame and even-frame sample selection sections, respectively, of the analog drive circuit.

The analog drive circuit 214 will now be described with reference to FIG. 10B. The analog drive circuit 214 is the analog drive circuit of the exemplary pixel 212 shown in FIG. 10A. The analog drive circuit can be regarded as being composed of the odd-frame 226O sample selection section, the even-frame sample selection section 226E and the drive signal generator 228. Both sample selection sections are composed of identical circuits whose operations are time multiplexed to maximize the illumination efficiency of the spatial light modulator 100. One of these duplicate circuits receives an analog sample of the current frame of the video signal at the same time as the drive signal generator generates a drive signal in response to an analog sample of the previous frame stored in the other.

The odd-frame sample selection section 226O selects an analog sample derived from each odd frame of the video signal and stores the selected analog sample in an odd-frame sample storage capacitor, and the even-frame sample selection section 226E selects an analog sample derived from each even frame and stores this analog sample in an even-frame storage capacitor. The analog samples stored in the storage capacitors are alternately selected and fed to the drive signal generator 228 which generates a drive signal in response to each analog sample. The drive signal generator sequentially generates drive signals in response to the analog samples derived from consecutive frames of the video signal. Each drive signal generated by the drive signal generator additionally restores the DC balance of the pixel 212.

The odd-frame sample selection section 226O of the analog drive circuit 214 of the exemplary pixel 212 will now be described. The even-frame sample selection section 226E is almost identical and will not be described. Corresponding elements of the odd-frame sample selection section and the even-frame sample selection section are indicated by the same reference numerals with the letters O and E, respectively, added.

The sample input 250 of the analog drive circuit 214 is connected to the column bus 131₂. Also connected to the sample input is the drain of the sample select transistor 252O, the gate of which is connected via the odd row select input 210O to the odd-frame row select bus 133O₂. The source of the sample select transistor is connected to one electrode of the sample storage capacitor 254O. The other electrode of the sample storage capacitor is connected to a constant voltage level, e.g., ground.

The node between the sample storage capacitor 254O and the source of the sample select transistor 252O is also connected to the source of the sample output transistor 256O. The drain of the sample output transistor is connected to the B input of the comparator 255. The gate of the sample output transistor is connected to the control signal EVEN generated by the clock generator 242 and distributed by the even control bus 239 to the gates of the sample output transistors of the odd-frame sections of the analog drive circuits of all the pixels constituting the pixel array 202. The sample output transistor 256O is operated by the control signal EVEN because the odd-frame sample selection section 226O feeds stored analog samples to the drive signal section 228 at the same time as the even-frame sample section and storage section 226E receives an analog sample from the sample input 250. For a similar reason, the sample output transistor 256E of the even-frame sample selection section 226E is controlled by the control signal ODD distributed by the odd control bus 237.

The control signal EVEN is also connected to the gate of the ramp signal selector transistor 257O. The source of the ramp signal selector transistor is connected to the ramp signal RAMP generated by the ramp generator 244 (FIG. 10A) and distributed by the ramp signal bus 213 to the ramp signal selector transistors of the analog drive circuits of all the pixels constituting the pixel array 202. The drain of the ramp signal selector transistor 257O is connected to the A input of the comparator 255.

The even-frame sample selection section 226E differs from the odd-frame sample selection section 226O only in that the drain of the sample output transistor 256E is connected to the A input of the comparator 255, the drain of the ramp signal selector transistor 257E is connected to the B input of the comparator, and the gates of the transistors 256E and 257E are connected to the ODD control signal. With this arrangement, analog samples derived from the even fields of the video signal and stored in the sample storage capacitor 254E are fed to the A input of the comparator and the ramp signal is fed to the B input, whereas analog samples derived from the odd frames and stored in the sample storage capacitor 254O are fed to the B input of the comparator and the ramp signal is fed to the A input.

The drive signal generator 228 will now be described. The drive signal generator includes the comparator 255. The comparator 255 is a switched-sense comparator that has detection sense that depends on the state of the comparator sense control signal SENSE generated by the clock generator 242 and distributed by the comparator sense bus 260 to the comparators of all the pixels constituting the pixel array 202. The comparator sense control signal serves two functions. First, the comparator sense control signal inverts the detection sense of the comparator in the illumination periods of successive frames. This provides the comparator with a constant detection sense with respect to the ramp signal and the analog samples despite the alternation of the connections of the ramp signal and the analog samples to the A and B inputs of the comparator. For odd-frame analog samples, the detection sense of the comparator is conventional, and the output of the comparator in a 1 state or a 0 state, depending on whether the voltage on the A input is greater than, or less than, the voltage on the B input. For even-frame analog samples, the detection sense is inverted and the output of the comparator in a 1 state or a 0 state, depending on whether the voltage on the B input is greater than, or less than, the voltage on the A input. Second, the comparator sense control signal inverts the detection sense of the comparator in the balance period following each illumination period. This enables the comparator to generate the balance portion of the drive signal simply by repeating of the cycle of the ramp signal connected to one of its inputs.

Alternating the inputs of the comparator 255 to which the analog samples and the ramp signal are connected and inverting the detection sense of the comparator reduces the visibility of errors resulting from differences in the input offset voltages of the comparators. The inputs are alternated and the detection sense of the comparator is inverted between consecutive frames. For example, in an odd frame, the input offset may add to the analog sample so that the pixel appears brighter than its nominal brightness. In the following even frame, the input offset adds to the ramp signal, so the pixel appears dimmer than its nominal brightness. The brighter appearance and the dimmer appearance of the pixel average between the two frames, so that the pixel appears at its nominal brightness.

If the input offset voltage of the comparator 255 is small, or the input offset voltages of the comparators of all the analog drive circuits of the pixel array 102 are similar, the analog drive circuit can be simplified. This can be done by eliminating the ramp signal selector transistors 257O and 257E, connecting the ramp signal to the A input, for example, of the comparator, and connecting the drains of the sample output transistors 256O and 256E to the B input of the comparator. In this case, the waveform of the comparator sense control signal should be changed so that the detection sense of the comparator is normal in the illumination periods and inverted in the balance periods.

The output of the comparator 255 is connected to the pixel electrode 118 by the conductor 120.

Figure 10B:
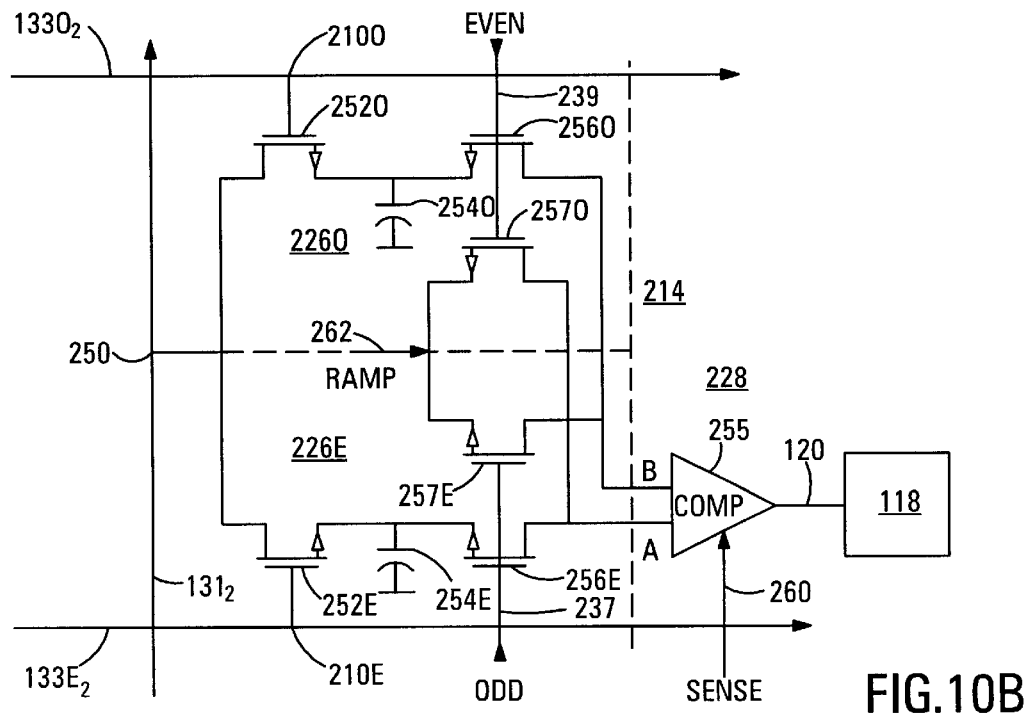
FIG 10B is a schematic diagram of the second embodiment of the analog drive circuit according to the invention.
Figure 15A:
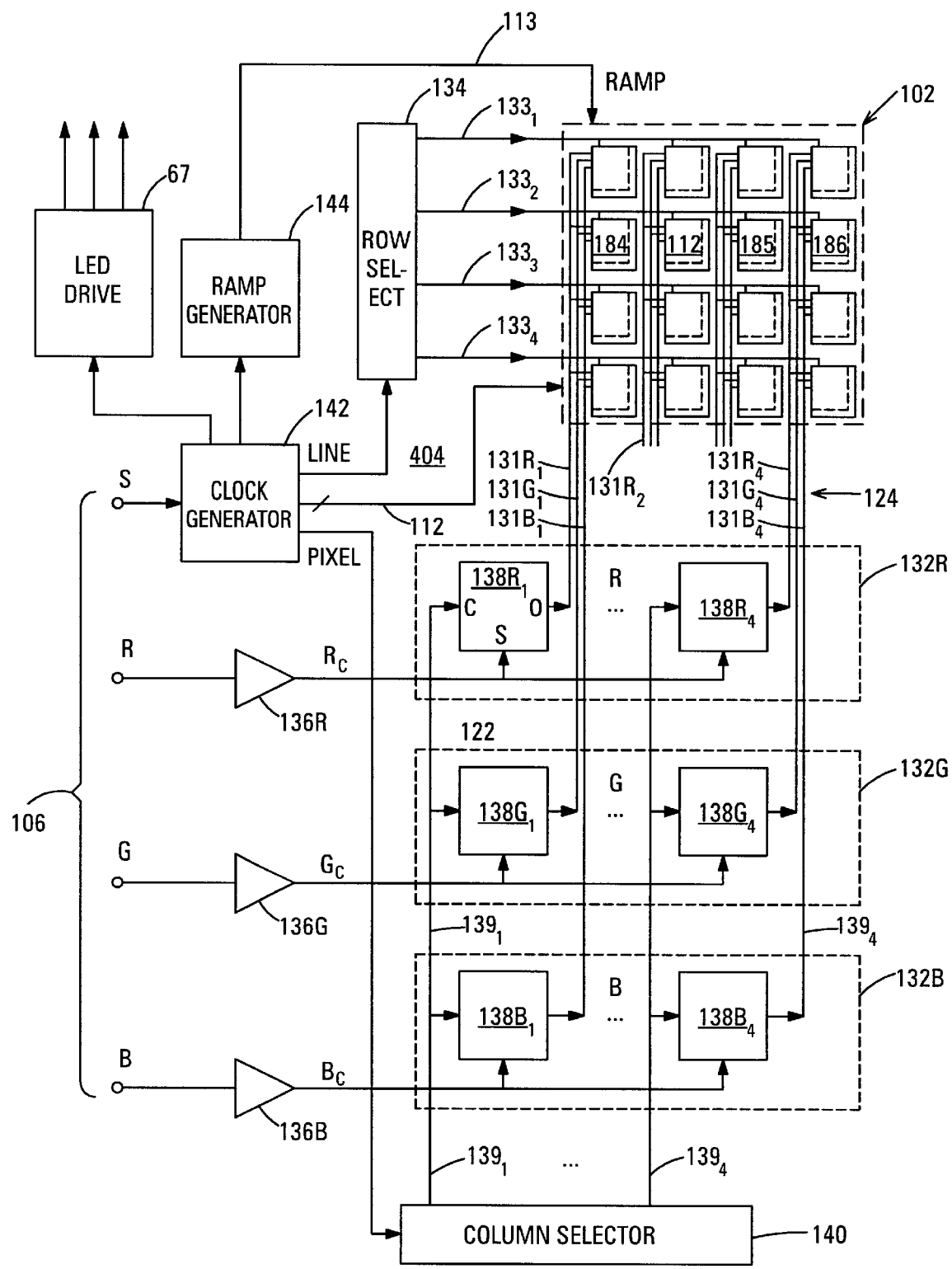
FIG. 15A is a block diagram showing the pixel array and the parallel-load sample derivation and distribution circuit of a first embodiment of a color display device that incorporates a third embodiment of the analog drive circuit according to the invention.
Figure 15B:
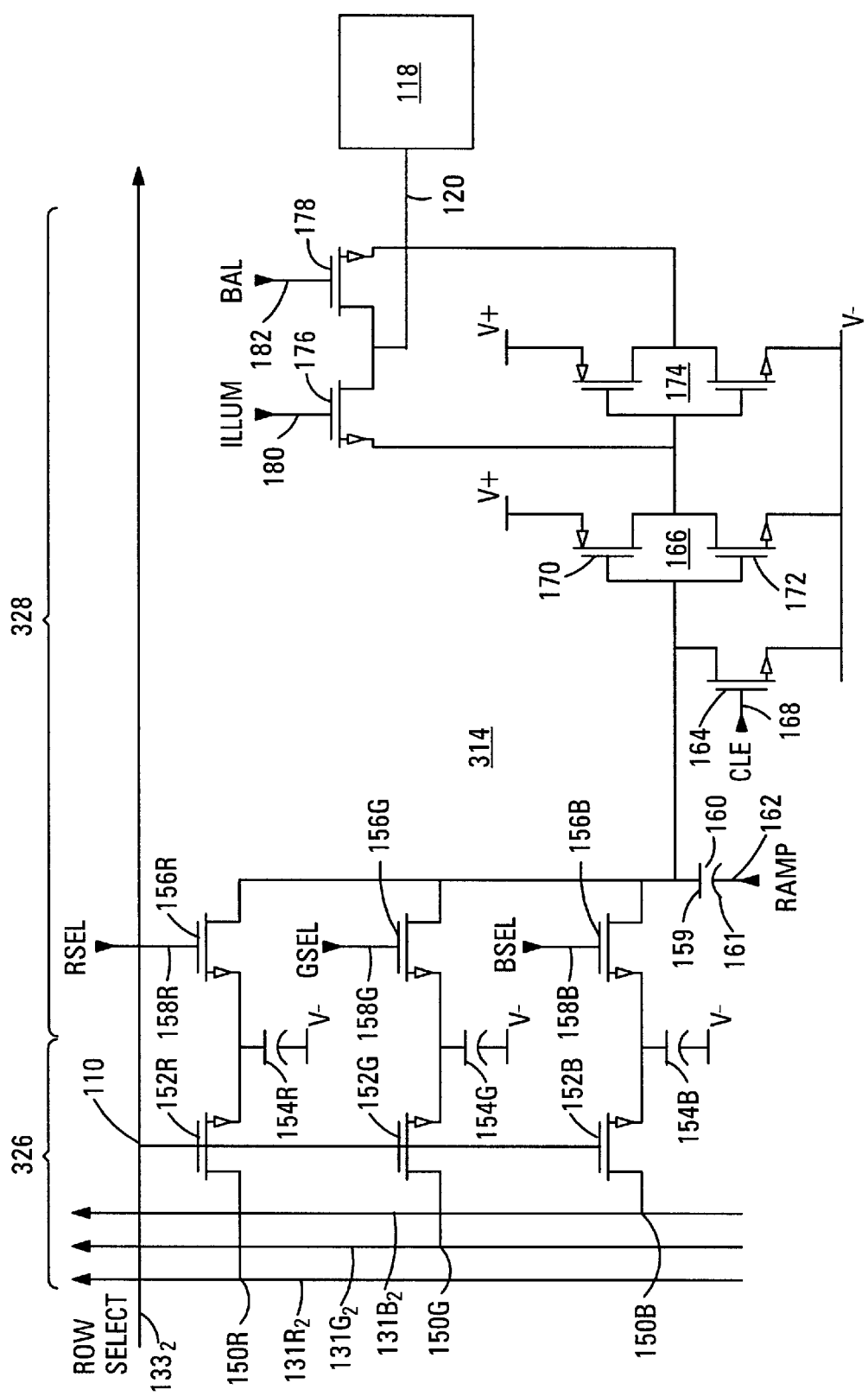
FIG. 15B is a schematic diagram of the third embodiment of the analog drive circuit according to the invention for displaying a color video signal.

The drive signal generators shown in FIGS. 8 or 15B may be substituted for the drive signal generator 228 shown in FIG. 10B.

Operation of the analog drive circuit 214 of the exemplary pixel 212 will now be described with reference to FIGS. 10A, 10B and 11A–11O. The exemplary pixel 212 is located in the second column of the second row of the pixel array 202. FIGS. 11A–11O show the waveforms in various parts of the circuit in the course of loading analog samples of three consecutive frames 1, 2 and 3 of the video signal into the sample selection sections 226O and 226E of the circuit, and generating drive signals in response to analog samples of the previous frame 0 and frames 1 and 2. FIG. 11A shows the operations sequentially performed by the odd-frame sample and storage section 226O and the drive signal generator 228 of the analog drive circuit on analog samples of the odd-numbered frames of the video signal. FIG. 11B shows the operations sequentially performed by the even-frame sample selection storage section 226E and the drive signal generator 228 on analog samples of the even frames. Frames 1 and 3 are odd frames, and frames 0 and 2 are even frames.

As shown in FIG. 11A, during the frame 1 sample load period, in which frame 1 is received at the video input 106 (FIG. 10A), an analog sample of frame 1 is loaded into the odd-frame sample selection section 226O. The frame 0 display period shown in FIG. 11B is concurrent with the frame 1 sample load period. During the illumination period of the frame 0 display period, the drive signal generator 228 of the circuit generates a drive signal in response to an analog sample of the previous frame, frame 0, and the spatial light modulator 100 is illuminated with light generated by the LEDs 69–71. The waveform $I_{LED}$ drive signal of the LEDs is schematically shown in FIG. 11C. In the balance period of the frame 0 display period shown in FIG. 11B, the drive signal generator generates a drive signal that restores the DC balance of the pixel, and the spatial light modulator is not illuminated.

During the frame 2 sample load period shown in FIG. 11B, in which frame 2 is received at the video input 106 (FIG. 10A), an analog sample of frame 2 is loaded into the even-frame sample selection section 226E. The frame 1 display period shown in FIG. 11A is concurrent with the frame 2 sample load period. During the illumination period of the frame 1 display period, the drive signal generator 228 generates a drive signal in response to the analog sample of frame 1 stored in the odd sample selection section 226O, and the spatial light modulator 100 is illuminated with light generated by the LEDs 69–71. In the balance period of the frame 1 display period shown in FIG. 11A, the drive signal generator generates a drive signal that restores the DC balance of the pixel, and the spatial light modulator is not illuminated.

Finally, during the frame 3 sample load period shown in FIG. 11A, in which frame 3 is received at the video input 106 (FIG. 10A), an analog sample of frame 3 is loaded into the odd-frame sample selection section 226O. The frame 2 display period shown in FIG. 11B is concurrent with the frame 3 sample load period. During the illumination period of the frame 2 display period, the drive signal generator 228 generates a drive signal in response to the analog sample of frame 2 stored in the even sample selection section 226E, and the spatial light modulator is illuminated with light generated by the LEDs 69–71. In the balance period of the frame 2 display period, the drive signal generator generates a drive signal that restores the DC balance of the pixel, as shown in FIG. 11A, and the spatial light modulator is not illuminated.

FIGS. 11D and 11E show the states of the control signal ODD and the control signal EVEN, respectively. The control signal ODD is in its 1 state during the odd-frame sample load periods, i.e., during the periods that the odd-numbered frames are received at the video input 106, and is in its 0 state during the even-frame sample load periods, i.e., the periods during which the even-numbered frames are received at the video input. The control signals ODD and EVEN are slightly asymmetrical to prevent the transistors controlled by these control signals being ON simultaneously and to prevent charge sharing between the capacitors 254O and 254E as a result.

In the sample load period of each frame of the video signal, an analog sample of the frame is loaded into the analog drive circuit 214 by processes similar to those described above with reference to FIGS. 6A–6R. The analog samples from the odd frames of the video signal are loaded into the odd-frame sample selection section 226O of the analog drive circuit in response to the odd-frame row select signal. FIG. 11F shows the odd-frame row select signal odd sel fed via the odd-frame row select bus 133O$_2$ to the analog drive circuits of the pixels located in the second row of the pixel array 202. The odd-frame row select signal causes the odd-frame sample selection sections of the analog drive circuits of only the pixels located in the second row to accept the analog samples from the column busses 131$_1$–131$_4$, and corresponds to the row select signal shown in FIG. 6B. However, as can be seen in FIG. 11F, the odd-frame row select signal is only asserted during the sample load periods of the odd frames of the video signal. FIG. 11G shows the even-frame row select signal even sel fed via the even-frame row select bus 133E$_2$ to the analog drive circuits of the pixels located in the second row of the pixel array 202. The waveform of the even-frame row select signal is the same as that of the odd-frame row select signal shown in FIG. 11F, delayed by one frame period.

Each of the row select control signals is shown in FIGS. 11F and 11G as being in its 1 state for the duration of one line of the video signal, and is in its 0 state until the corresponding line of the next odd or even frame. However, the row select control signals may switch to their 1 states at a time later than the start of their respective lines.

FIG. 11H shows how the voltage V254O on the odd-frame sample storage capacitor 254O of the analog drive circuit 214 changes during the sample load periods of frames 1–3. Initially, the voltage on the sample storage capacitor corresponds to the analog sample of the twice-previous frame (frame −1, an odd frame) of the video signal, as shown at 261. Then, the odd-frame row select signal shown in FIG. 11F is asserted during the second line of frame 1. This signal causes the sample select transistor 252O to connect the sample storage capacitor 254O to the column bus 131$_2$. After a delay corresponding to one pixel, the analog sample corresponding to the second pixel of the second line of the frame 1 is fed to the sample storage capacitor. This causes the voltage on the capacitor to change to the level, as indicated at 263 in FIG. 11H. After a delay corresponding to two more pixels, the odd-frame row select signal is de-asserted, which causes the sample select transistor to disconnect the sample storage capacitor from the column bus. The sample storage capacitor continues to hold a voltage corresponding to the analog sample of frame 1 until the odd-frame row select signal shown in FIG. 11H is next asserted during frame 3. Then, the sample storage capacitor accepts an analog sample of frame 3, as shown at 265 in FIG. 11H.

During the even frame sample load periods, the even-frame row select signal fed via the even-frame row select bus 133E$_2$ to the analog drive circuits of the pixels located in the second row of the pixel array 202 is asserted, as shown in FIG. 11G. The even-frame row select signal causes the even-frame sample selection sections of the analog drive circuits of only the pixels located in the second row of the pixel array to accept analog samples from the column busses 131$_1$–131$_4$. FIG. 11I shows how the voltage V254E on the sample storage capacitor 254E of the analog drive circuit 214 changes during frames 1–3. Initially, the voltage on the sample storage capacitor corresponds to the analog sample of the previous frame (frame 0, an even frame) of the video signal, as shown at 267. Then, the even-frame row select signal is asserted during the second line of frame 2, as shown in FIG. 11G. This signal causes the sample select transistor 252E to connect the sample storage capacitor 254E to the column bus 131$_2$. After a delay corresponding to one pixel, the analog sample corresponding to the second pixel of the second line of frame 2 is fed to the sample storage capacitor. This causes the voltage on the capacitor to change to one corresponding to the analog sample, as indicated at 269 in FIG. 11I. After a delay corresponding to two more pixels, the even-frame row select signal is de-asserted, which causes the sample select transistor 252E to disconnect the sample storage capacitor from the column bus. The sample storage capacitor continues to hold the voltage corresponding to the analog sample through the rest of the sample load periods of frames 2 and 3 until the even-frame row select signal is next asserted in the next even frame 4 (not shown).

FIGS. 11J–11O show how, in each frame period, the drive signal generator 228 generates the drive signal in response to the analog sample of the previous frame loaded into one of the sample selection sections 226O and 226E during the sample load period of the previous frame. FIG. 11J shows the waveform RAMP of the ramp signal V$_{RAMP}$. In the example shown, the ramp signal has a sawtooth waveform and has a period equal to one-half of the frame period. A ramp signal with a linear voltage-time characteristic is shown to simplify the drawings, but a non-linear characteristic is preferred. A non-linear characteristic enables gamma correction to be performed, as discussed above. The ramp signal is shown in FIG. 11J as beginning in a low state and increasing towards a high state. However, this is not critical. The ramp signal may begin in a high state and decrease towards a low state. Moreover, the ramp signal may begin in the low state and increase towards the high state during the illumination period and may then decrease towards the low state in the following balance period, or vice versa.

FIGS. 11K and 11L respectively show the voltages V$_A$ and V$_B$ on the A and B inputs, respectively of the comparator 255. In addition, broken lines show the waveforms of the portions of the ramp signal fed to the other input of the comparator. At the start of the frame 0 illumination period shown in FIG. 11B, the control signal ODD shown in FIG. 11D changes to its 1 state. This turns the sample output transistor 256E and the ramp signal selector transistor 257E ON. At the same time, the control signal EVEN changes to its 0 state, as shown in FIG. 11E, and turns the sample output transistor 256O and the ramp signal selector transistor 257O OFF. Consequently, the analog sample of the previous frame 0 stored in the sample storage capacitor 254E of the even sample selection section is connected to the A input of the comparator 255, as shown in FIG. 11K. The ramp signal RAMP is connected to the B input of the comparator, as shown in FIG. 11L. The waveform of the ramp signal is also shown as a broken line in FIG. 11K.

Since the level on the A input of the comparator is initially higher than that of the B input, the nominal output state out of the comparator is a 1, as shown at 271 in FIG. 11M. The comparator sense control signal SENSE shown in FIG. 11N is in its 1 state, so the detection sense of the comparator is normal and the drive signal PIX connected to the pixel electrode 118 is in the 1 state for the duration of the first temporal portion of the illumination period, as shown at 273 in FIG. 11O.

The ramp signal RAMP increases as the frame 0 illumination period progresses. When the ramp signal slightly exceeds the voltage of the sample storage capacitor 254E, the nominal output state of the comparator 255 and, hence, the state of the pixel electrode 118, change from a 1 to a 0. This marks the end of the first temporal portion of the illumination period. The electrode remains in the 0 state for the second temporal portion shown at 275 in FIG. 11O. The second temporal portion constitutes the remainder of the frame 0 illumination period.

At the beginning of the frame 0 balance period shown in FIG. 11B, the level of the ramp signal RAMP shown in FIG. 11J returns to zero, and the nominal output of the comparator 255 shown in FIG. 11M changes state. However, since the comparator sense control signal SENSE also changes state, as shown in FIG. 11N, the actual output of the comparator remains unchanged. Consequently, the state of the pixel electrode remains unchanged during the first temporal portion of the balance period, as shown at 277 in FIG. 11O.

The ramp signal RAMP once more increases as the frame 0 balance period progresses. When the ramp signal slightly exceeds the voltage of the sample storage capacitor 254E, the nominal output state of the comparator 255 changes from 0 to 1. Since the comparator sense control signal remains unchanged, the state of the pixel electrode also changes from 0 to 1. This marks the end of the first temporal portion of the balance period. The electrode remains in this state during the secod temporal portion, a shown at 279 in FIG. 11O, constituting the remainder of the balance period. The spatial light modulator is not illuminated during the balance period. The states of the drive waveform in the first and second temporal portions of the balance period are opposite to those in the first and second temporal portions, respectively, of the illumination period so that the DC balance of the pixel is restored.

At the start of the frame 1 illumination period, the control signal EVEN shown in FIG. 11E changes to its 1 state. This turns the sample output transistor 256O and the ramp signal selector transistor 257O of the odd-frame sample selection section 226O ON. At the same time, the control signal ODD changes to its 0 state, as shown in FIG. 11D, which turns the sample output transistor 256E and the ramp signal selector transistor 257E of the even-frame sample selection section 226E OFF. Consequently, the sample storage capacitor of the odd sample selection section, in which an analog sample of frame 1 was stored during the frame 1 sample load period, as shown in FIG. 11H, is connected to the B input of the comparator 255, as shown in FIG. 11L. The ramp signal RAMP is connected to the A input of the comparator, as shown in FIG. 11K. The waveform of the ramp signal is also shown as a broken line in FIG. 11L.

Since the level on the B input of the comparator 255 is initially higher than that on the A input, the nominal output of the comparator is 0, as shown at 281 in FIG. 11M. The comparator sense control signal SENSE shown in FIG. 11N is in its 0 state, so the detection sense of the comparator is inverted, and the pixel electrode remains in the 1 state during the first temporal portion of the frame 1 illumination period, as shown at 283 in FIG. 11O.

The ramp signal increases as the frame 1 illumination period progresses. When the ramp signal slightly exceeds the voltage stored in the sample storage capacitor 254E, the nominal output of the comparator changes from 0 to 1 and the state of the pixel electrode changes from 1 to 0, as shown at 285 in FIG. 11O. The electrode remains in this state for the second temporal portion constituting the remainder of the frame 1 illumination period during which the spatial light modulator is illuminated (see FIG. 11C).

At the beginning of the frame 1 balance period, the level of the ramp signal RAMP returns to zero, and the nominal output of the comparator 255 shown in FIG. 11M changes from 1 to 0. The comparator sense control signal SENSE also changes from 0 to 1, so the state of the pixel electrode remains unchanged (and opposite to that during the first temporal portion of the frame 1 illumination period) during the first temporal portion of the balance period, as shown at 287 in FIG. 11O.

The ramp signal increases as the frame 1 balance period progresses. When the ramp signal slightly exceeds the voltage stored in the sample storage capacitor 254O, the nominal output of the comparator 255 shown in FIG. 11M changes from 0 to 1. Since the comparator sense control signal remains unchanged, the state of the pixel electrode also changes from 0 to 1, as shown at 289 in FIG. 11O. The pixel electrode remains in this state for the second temporal portion constituting the remainder of the frame 1 balance period. The spatial light modulator is not illuminated during the frame 1 balance period. The states of the drive waveform in the first and second temporal portions of the balance period are opposite to those in the first and second temporal portions, respectively, of the illumination period so that the DC balance of the pixel is restored.

Operation of the analog drive circuit 214 during the frame 2 illumination and balance periods is the same as during the frame 0 illumination and balance periods, respectively, and will therefore not be described. During the frame 2 illumination period, the analog drive circuit applies a drive signal to the pixel electrode in response to the analog sample of frame 2. This analog sample was stored in the sample storage capacitor 254E during the frame 2 sample load period.

It can be seen from FIGS. 11K and 11L that the first temporal portion of the illumination period, during which the drive signal applied to the electrode 212 is in the 1 state, depends on the level of the analog sample stored in the respective one of the sample storage capacitors during the previous frame. The analog sample of frame 1 has relatively low level whereas the analog sample of frame 2 has a relatively high level. The fraction of the illumination period constituted by the first temporal portions during the frame 1 illumination period and the frame 2 illumination period, respectively, in response to these analog samples depends on the levels of the analog samples.

FIG. 12 shows an example of a circuit that may be used as the switched-sense comparator 255 in the analog drive circuit 214 shown in FIG. 10B.

The comparator 255 is composed of the conventional comparator 311, the output of which is fed to one input of the exclusive-OR (XOR) gate 313. The control signal SENSE is distributed from the clock generator 142 to the analog drive circuits of all the pixels via the bus 260. When the control signal SENSE is in its 1 state, the detection sense of the comparator 255 is the same as that of the conventional comparator 311. When the control signal SENSE is in its 0 state, the detection sense of the comparator 255 is the inverse of that of the conventional comparator 311.

Figure 13:
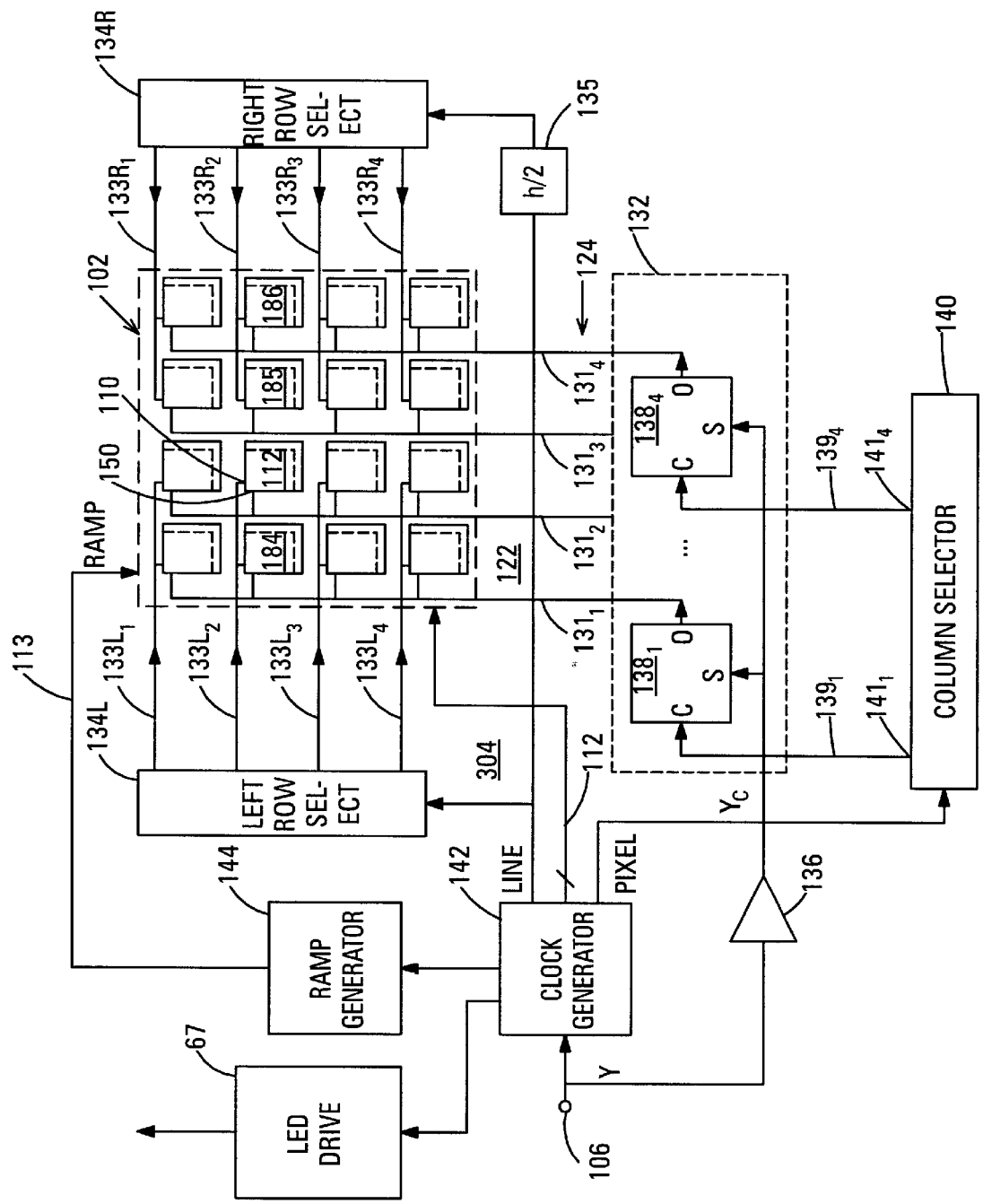
FIG. 13 is a block diagram showing the pixel array and the sample derivation and distribution circuit of a variation of the second embodiment of the monochrome display device.

In the embodiments of the spatial light modulator described above, the analog samples are distributed to the pixels by the column busses $131_1$–$131_4$. In a practical embodiment, the column busses are long and have substantial capacitance and therefore delay the analog samples transmitted along them. Moreover, comparing FIGS. 6D and 6J–6M shows that the control signal on each of the row select busses $133_1$–$133_4$ is de-asserted almost at the same time as the last analog sample of each line of the video signal is placed on the column bus $131_4$. This, together with the transmission delay on the column busses causes less than the full analog sample to be loaded into the analog drive circuits of the pixels at the right-hand side of the pixel array. The problem is especially severe in the pixels that are remote from the sampling circuit 132, i.e., the pixels in the upper right of the pixel array in the examples shown in FIGS. 4A and 10A. The problem can be overcome using the embodiment 304 of the sample derivation and distribution circuit shown in FIG. 13. The embodiment shown in FIG. 13 is a variation of the embodiment of the sample derivation and distribution circuit shown in FIG. 4A and uses the analog drive circuit shown in FIG. 4B. The embodiments shown in FIGS. 10A, 15A and 16 can be similarly modified.

In the sample derivation and distribution circuit 304 shown in FIG. 13, the row select busses are broken at the center of the pixel array to form two sets of row select busses $133L_1$–$133L_4$ and $133R_1$–$133R_4$. The left-hand row select busses $133L_1$—$133L_4$ are connected to the row select inputs of the analog drive circuits of the pixels in the left-hand half of the pixel array (columns 1 and 2 in the example shown) and to the output of the left-hand row selector 134L. The right-hand row select busses $133R_1$–$133R_4$ are connected to the row select inputs of the analog drive circuits of the pixels in the right-hand half of the pixel array (columns 3 and 4 in the example shown) and to the output of the right-hand row selector 134R. The left-hand and right-hand row selectors are identical to the row selector 134 described above with reference to FIG. 4A, and so will not be described again here. The clock signal LINE, described above with reference to FIG. 4A, is fed to the clock input of the left-hand row selector 134L, and is also fed via the half-line delay 135 to the right-hand row selector 134R.

Operation of the sample derivation and distribution circuit shown in FIG. 13 will now be described with reference to FIGS. 14A–14F. FIGS. 14A–14D respectively show the control signals $139_9$–$139_4$ on the control lines $139_1$–$139_4$ connected to the control inputs of the S/H circuits $138_1$–$138_4$ during the picture period of one frame of the video signal. An analog sample is placed on the respective column bus $131_1$–$131_4$ at each falling edge of these waveforms.

Operation of left-hand row selector 134L is identical to that of the row selector 134 described above with reference to FIGS. 6J–6M. As shown in FIG. 14E, the control signal on the row select bus $133L_1$ switches to its 1 state at the beginning of the first line of the video signal, and remains in its 1 state until the end the first line. However, during the second half of the first line, no sampling is performed by the sample-and-hold circuits $138_1$ and $138_2$ whose outputs are connected via the column busses $131_1$ and $131_2$ to the analog drive circuits connected to the row select bus $133L_1$. Accordingly, the analog drive circuits in the first row of the pixel array that are connected to the row select bus $133L_1$ have a time corresponding to about one-half of the line period to receive their respective analog samples.

Operation of right-hand row selector 134R is similar to that of the row selector 134 described above with reference to FIGS. 6J–6M, but is delayed by one-half of the line period. As shown in FIG. 14F, the control signal $133R_1$ on the row select bus $133R_1$ is in its 0 state during the first half of the first line of the video signal, and changes to its 1 state half-way through the first line period. The change in state takes place prior to the sample-and-hold circuits $138_3$ and $138_4$ feeding any analog samples of the first line of the video signal onto the column busses $131_3$ and $131_4$. Consequently, the analog drive circuits in the first row of the pixel array that are connected to the row select bus $133R_1$ are able to receive the analog samples of the first line of the video signal when these analog samples are put on the respective column busses.

The row select bus $133R_1$ remains in its 1 state for the remainder of the first line of the video signal, and for the first half of the second line of the video signal, as shown in FIG. 14F. During the first half of the second line, no sampling is performed by the sample-and-hold circuits $138_3$ and $138_4$ whose outputs are connected via the column busses $131_3$ and $131_4$ to the analog drive circuits connected to the row select bus $133R_1$. Accordingly, the analog drive circuits in the first row of the pixel array that are connected to the row select bus $133R_1$ have a time corresponding to about one-half of the line period to receive their respective analog samples.

The row selectors 134L and 134R operate in a manner similar to that described during the remaining lines 2–4 of the frame of the video signal.

In the example shown, the row select busses are broken symmetrically. However, this is not critical: the row select busses may be broken asymmetrically with an appropriate change to the delay of the delay module 135. For example, the circuit may be configured so that the right row selector 134R controls only the analog drive circuits located near the end of each line that would have insufficient time to receive their analog samples if they were controlled by the left row selector 134L.

In the examples shown in FIG. 14E and 14F, each output of each row selector is in its 1 state for one line period. However, this is not critical. The control signals on the row select busses $133L_1$ and $133R_1$ are shown in FIGS. 14E and 14F as switching to their 1 states at the beginning and mid-point, respectively, of line 1. However, the row select control signals may switch to their 1 states may switch to their 1 states at a time later than the beginning and mid-point, respectively, of line 1. Moreover, these control signals are shown as reverting to their 0 states at the end of line 1 and the mid-point of line 2, respectively. However, as long as these control signals remain in their 1 for longer than the longest settling time of the analog drive circuits connected to them, they may revert to their 0 states some time before the end of line 1 and the mid-point of line 2, respectively. The setting time of an analog drive circuit is the time required for an analog sample to transfer fully to the analog drive circuit from the sample-and-hold circuit to which the analog drive circuit is connected.

An example of a color display device based on the embodiment shown in FIGS. 4A and 4B is shown in FIGS. 15A and 15B in which elements corresponding to those in FIGS. 4A and 4B are indicated by the same reference numerals. In the embodiment shown in FIGS. 15A and 15B, the sample selection section 326 of the exemplary analog drive circuit 314 includes three sample storage capacitors 154R, 154G and 154B, one for each color component of the color video signal. The parallel sample derivation and distribution circuit 404 includes three sampling circuits 132R, 132G and 132B, one for each color component of the color video signal. The sampling circuits each take analog samples from one color component of the color video signal and distribute the analog samples to the respective sample storage capacitors through one of three color component-specific column busses for each column in the pixel array 102. The column color component-specific column busses for the first column of the pixel array are $131R_1$, $131G_1$ and $131B_1$, for example.

In the drive signal generator 328 of the analog drive circuit 314 shown in FIG. 15B, the sample output transistors 156R, 156G and 156B operate in response to the sequentially-supplied select control signals RSEL, GSEL and BSEL, respectively, to sequentially connect the analog sample stored in the sample storage capacitors 154R, 154G and 154B to the ramp capacitor 160 and the inverter 166. For each frame of the color video signal, the drive signal generator generates three drive signals, one in response to each of the three analog samples. During the illumination period of each of the drive signals, one of the LEDs 69–71 illuminates the spatial light modulator with light of a different color corresponding to the color component from which the analog sample was derived. During the balance period of each of the drive signals, the DC balance of the pixel is restored. In this embodiment, the display period for each color has a duration of one-third of the picture period of one frame of the color video signal.

The drive signal generator 328 shown in FIG. 15B may incorporate the offset correction circuitry shown in FIG. 8.

Figure 15C:
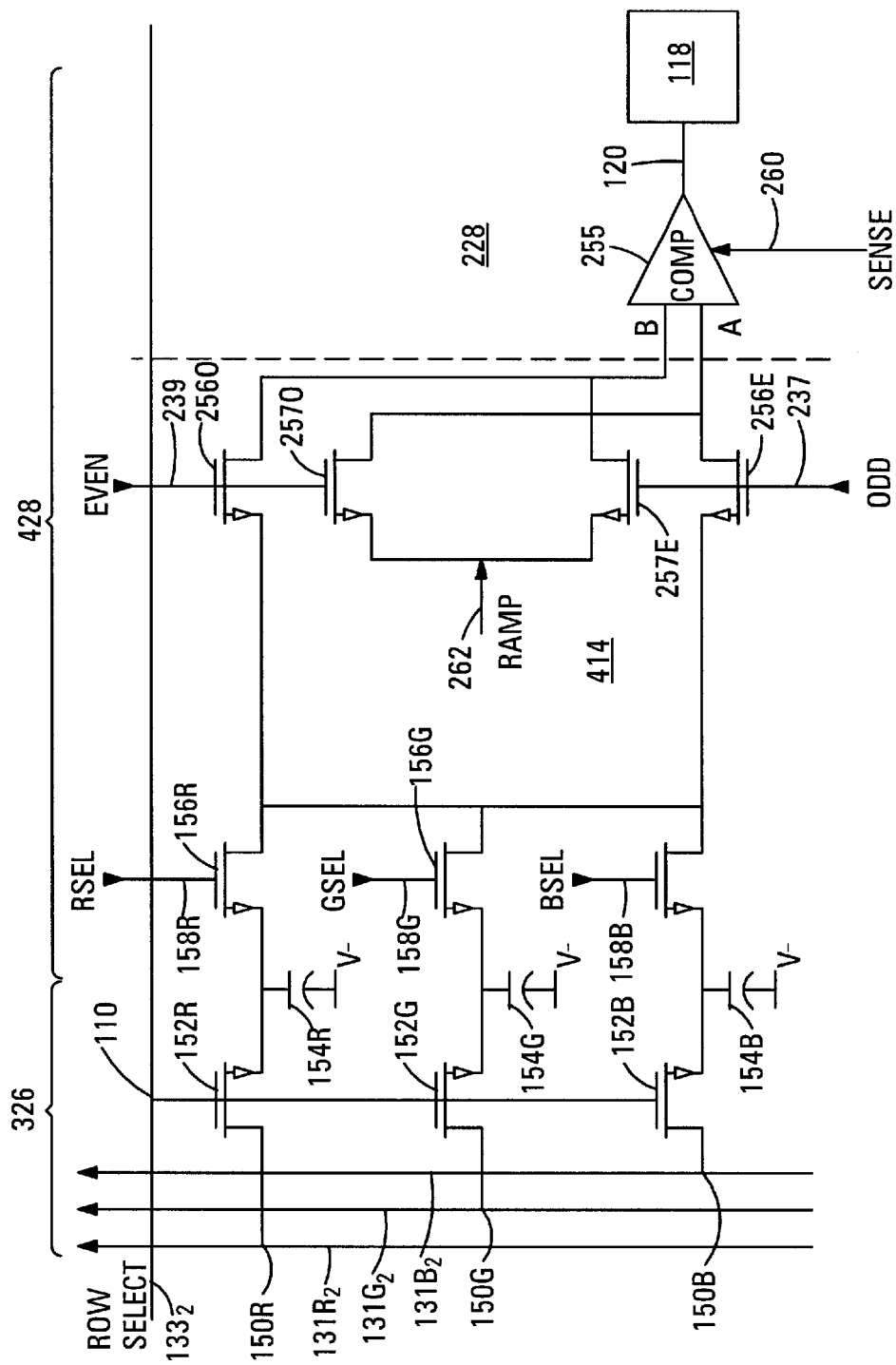
FIG. 15C is a schematic diagram of a fourth embodiment of the analog drive circuit according to the invention for displaying a color video signal.

The preferred embodiment of a color display device uses the parallel sample derivation and distribution circuit 404 shown in FIG. 15A but with the analog drive circuit 414 shown in FIG. 15C. The sample selection section 326 of the analog drive circuit is the same as that of the analog drive circuit 314 shown in FIG. 15B. The drive signal generator 428 of the analog drive circuit 414 incorporates the sample output transistors 156R, 156G and 156B of the drive signal generator 328 shown in FIG. 15B and the input change-over circuitry and switched-sense comparator 255 of the drive signal generator 228 of the analog drive circuit 214 shown in FIG. 10B. The input change-over circuitry, composed of the transistors 256O, 257O, 256E and 257E and the control signals ODD and EVEN, is disposed between the ramp signal bus 262 and the common node of the sample output transistors 156R, 156G and 156B on one hand and the inputs A and B of the comparator 255 on the other. The sample output transistors operate in response to the sequentially-supplied select control signals RSEL, GSEL and BSEL, respectively, to sequentially connect the analog sample stored in the sample storage capacitors 154R, 154G and 154B to the input of the comparator via the input change-over circuitry.

The input change-over circuitry operates in response to the control signals EVEN and ODD. These control signals change state in antiphase between odd-numbered and even-numbered frames of the video signal. The control signal SENSE changes the detection sense of the comparator to take account of the action of the input change-over circuitry and to invert the sense of the comparator between the illumination period and the balance period of each display period. The input change-over circuitry causes any offset error in the comparator average out in consecutive frames, as described above.

Figure 16:
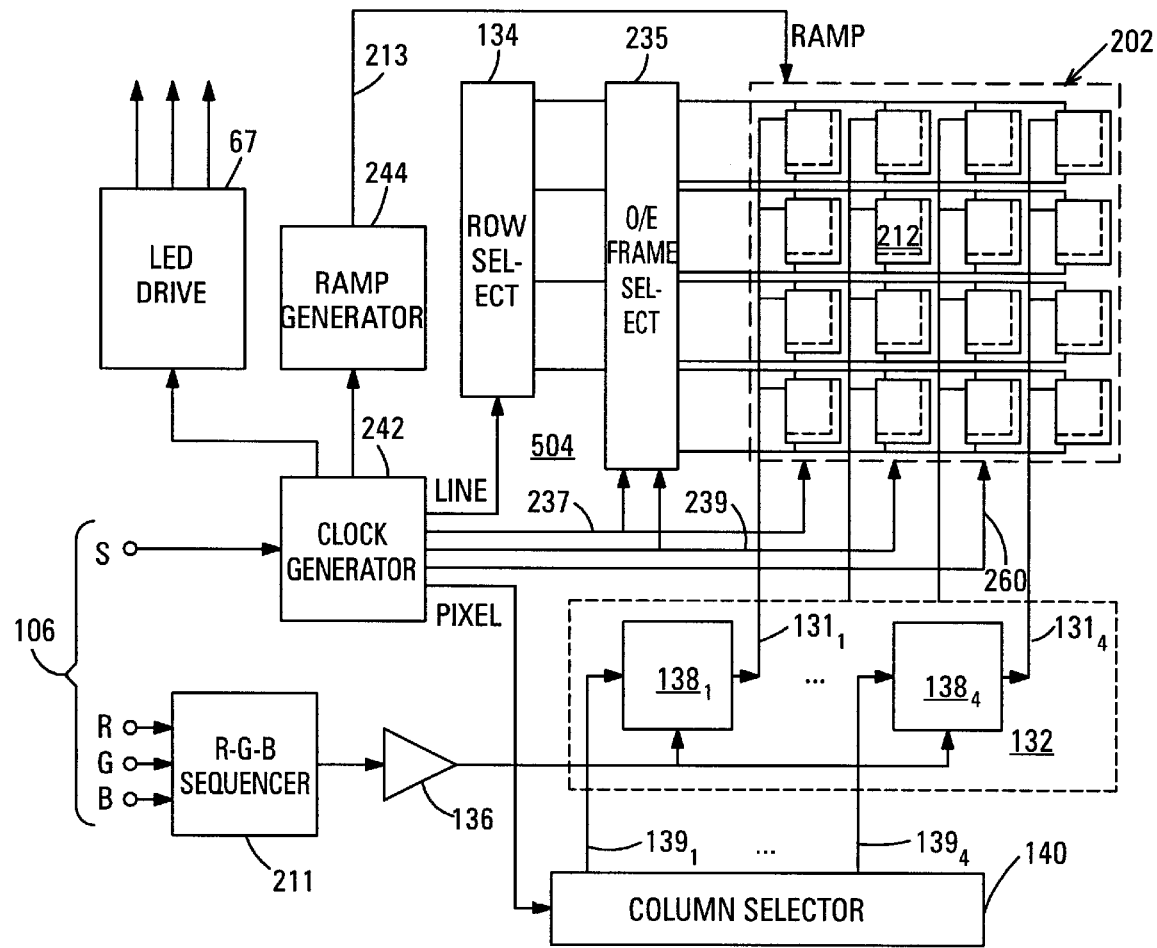
FIG. 16 is a block diagram showing the pixel array and the serial-load sample derivation and distribution circuit of a second embodiment of a color display device that incorporates the second embodiment of the analog drive circuit according to the invention.

An example of a serial-load sample derivation circuit 504 for use in a color display device based on the embodiment shown in FIG. 10A and 10B is shown in FIG. 16 in which elements corresponding to the embodiment shown in FIG. 10A are indicated by the same reference numerals. In the embodiment shown in FIG. 16, the analog drive circuits of the pixels is identical to the analog drive circuit 214 shown in FIG. 10B, and will not be described further. In the sample derivation and distribution circuit 504, the RGB sequencer 211 converts the color video signal to a color-sequential video signal in which the three color components of each frame of the color video signal are concatenated as frames of the color-sequential video signal. Depending on the capabilities of the graphics adaptor that generates the color video signal, the RGB sequencer 211 may be simple or more complex.

If the graphics adaptor is capable of generating a color-sequential video signal, the RGB sequencer may be omitted. If the graphics adaptor is a conventional graphics adaptor capable of a frame rate of greater than about 100 Hz, for example, and preferably greater than 180 Hz, the RGB sequencer can be a three-way switch. The switch sequentially selects the red, green and blue color components of consecutive frames of the color video signal as the frames of the color-sequential video signal. The switch selects the red component of a first frame, the green component of the second frame and the blue component of the third frame of the color video signal as the first frame, the second frame and the third frame, respectively, of the color-sequential video signal. The sequence then repeats, i.e., the switch selects the red component of the fourth frame of the color video signal as the fourth frame of the color-sequential video signal.

If the graphics adaptor is not capable of a high frame rate, the RGB sequencer 211 samples each color component of each frame of the color video signal. The samples derived from each color component are temporarily stored, and then are sequentially read out in color component order with a clock speed of three times the original sampling rate. Alternatively, a clock speed equal to the original sampling rate can be used, and two of every three samples not read out. The resulting color-sequential bit stream is then subject to digital to analog conversion to generate to the color-sequential video signal.

The sampling circuit 132 takes analog samples from the color-sequential video signal at the rate of the rate of the pixel clock generated by the clock generator 242 and feeds the analog samples to the column busses. In a time corresponding to the frame period of the color video signal, each pixel of the pixel array receives a sample derived from each of three consecutive frames of the color-sequential video signal corresponding to the three color components of the frame of the color video signal. After an analog sample of each frame of the color-sequential video signal has been loaded into one of the sample selection sections of the analog drive circuit of each pixel constituting the pixel array 202, the waveform generator of the analog drive circuit generates a drive signal in response to the analog sample. During the illumination period of the display period of the drive signal, one of the LEDs 69–71 illuminates the spatial light modulator with light of a color corresponding to the color component from which the analog sample was derived. In the balance period of the display period, the drive signal restores the DC balance of the pixel. In this embodiment, the display period has a duration equal to the frame period of the color-sequential video signal.

Although the above embodiments have been described with various exemplary logic states, signal states, transistor types and rows and columns, the embodiments can have opposite logic states, signal states, transistor types and rows and columns.

Although this disclosure describes illustrative embodiments of the invention in detail, it is to be understood that the invention is not limited to the precise embodiments described, and that various modifications may be practiced within the scope of the invention defined by the appended claims.

We claim:

1. An analog drive circuit for driving a pixel electrode in response to an analog sample derived from a video signal, the analog drive circuit comprising:

a sample selection section that receives and temporarily stores the analog sample during a sample load period; and a drive signal generator that, during a display period that follows the sample load period, generates a drive signal and applies the drive signal to the pixel electrode, the drive signal being composed of a sequence of a first temporal portion and a second temporal portion, the first temporal portion having a time duration dependent on the analog sample temporarily stored in the sample selection section, the second temporal portion being a temporal complement of the first temporal portion, the drive signal generator including a comparator having a first input, a second input and an output, the output being connected to the pixel electrode, the comparator generating the drive signal and having a detection sense set by a sense control signal having opposite states in consecutive frames of the video signal; and the analog drive circuit additionally includes:

a first switching arrangement that alternately connects a ramp signal to (a) the first input and (b) the second input of the comparator in consecutive display periods the ramp signal having a duration equal to the display period, and a second switching arrangement that alternately connects the sample selection section to (a) the second input and (b) the first input of the comparator in consecutive display periods.

2. The analog drive circuit of claim 1, in which the sample storage section includes:

a sample storage element;

a sample selection gate that opens during the sample load period to admit the analog sample to the sample storage element and that is closed during the display period; and a sample output gate that opens one of (a) during and (b) prior to the display period, the sample output gate being disposed between the sample storage element and the drive signal generator.

3. The analog drive circuit of claim 1, in which the drive signal generator includes a comparator that generates the drive signal, the comparator comprising:

a first input to which the sample selection section is connected, and a second input to which a ramp signal is connected, the ramp signal having a duration equal to the display period.

4. The analog drive circuit of claim 1, in which the drive signal generator operates in response to a ramp signal that has a non-linear slope to provide gamma correction.

5. The analog drive circuit of claim 1, in which:

the drive signal generator includes a comparator that generates the drive signal, the comparator including a first input and a second input and having a detection sense set by a sense control signal, the sense control signal having opposite states in consecutive frames of the video signal; and the analog drive circuit additionally includes:

a first switching arrangement that alternately connects a ramp signal to (a) the first input and (b) the second input of the comparator in consecutive display periods, the ramp signal having a duration equal to the display period, and a second switching arrangement that alternately connects the sample selection section to (a) the second input and (b) the first input of the comparator in consecutive display periods.

6. An analog drive circuit for driving a pixel electrode in response to an analog sample derived from a video signal, the analog drive circuit comprising:

a sample selection section that receives and temporarily stores the analog sample during a sample load period; and a drive signal generator that, during a display period that follows the sample load period, generates a drive signal and applies the drive signal to the pixel electrode, the drive signal being composed of a sequence of a first temporal portion and a second temporal portion, the first temporal portion having a time duration dependent on the analog sample temporarily stored in the sample selection section, the second temporal portion being a temporal complement of the first temporal portion, the drive signal generator including:

an inverter that generates the drive signal, the inverter having an input and an output;

a capacitor having a first electrode and a second electrode, the first electrode being connected to the input of the inverter and to the sample selection section, the second electrode being connected to a ramp signal having a duration equal to the display period; and a switch that discharges the capacitor prior to the display period.

7. The analog drive circuit of claim 6, in which:

the drive signal generator additionally includes:

a coupling capacitor coupling the input of the inverter to the sample selection section, and an additional switch that temporarily connects the output of the inverter to the input of the inverter prior to the display period; and the switch is coupled to a reference signal that has a state equal to a predetermined inverter threshold voltage when the additional switch connects the output of the inverter to the input.

8. An analog drive circuit for driving a pixel electrode in response to an analog sample derived from a video signal, the analog drive circuit comprising:

a sample selection section that receives and temporarily stores the analog sample during a sample load period; and a drive signal generator that, during a display period that follows the sample load period, generates a drive signal and applies the drive signal to the pixel electrode, the drive signal being composed of a first sequence of a first temporal portion and a second temporal portion, the first temporal portion having a time duration dependent on the analog sample temporarily stored in the sample selection section, the second temporal portion being a temporal complement of the first temporal portion, the first sequence having a duration equal to one half of the display period, the drive signal generator generating the drive signal in a first electrical state during the first temporal portion and in a second electrical state during the second temporal portion, and generating the drive signal additionally composed of a second sequence of the first temporal portion, in which the drive signal is in the second electrical state, and the second temporal portion, in which the drive signal is in the first electrical state, the first temporal portion and the second temporal portion being in any order in the second sequence.

9. The analog drive circuit of claim 8, in which the drive signal generator includes a comparator having an output connected to the pixel electrode, that generates the drive signal and that has a detection sense set by a sense control signal that changes state half-way through the display period, the comparator comprising:

a first input to which the sample selection section is connected; and a second input to which a ramp signal having a duration equal to one-half of the display period is connected.

10. The analog drive circuit of claim 8, in which:

the drive signal generator includes a comparator that generates the drive signal, the comparator comprising a first input and a second input and having a detection sense set by a sense control signal that changes state half-way through the display period; and the analog drive circuit additionally includes:

a switching arrangement that alternately connects the ramp signal to (a) the first input and (b) the second input of the comparator during consecutive display periods, and a switching arrangement that alternately connects the sample selection section to (a) the second input and (b) the first input of the comparator during consecutive display periods.

11. The analog drive circuit of claim 8, in which the drive signal generator includes:

a first inverter, the first inverter having an input and an output;

a second inverter having an input connected to the output of the first inverter, the second inverter having an output;

a capacitor having a first electrode and a second electrode, the first electrode being connected to the input of the first inverter and to the sample selection section, the second electrode being connected to a ramp signal having a duration equal to one-half of the display period;

a switch that discharges the capacitor prior to the display period; and a switching arrangement connected to the outputs of the first inverter and the second inverter and operating in response to a sense control signal that changes state half-way through the display period to take the output of one of (a) the first inverter and (b) the second inverter as the drive signal.

12. The analog drive circuit of claim 11, in which:

the drive signal generator additionally includes:

a coupling capacitor coupling the input of the inverter to the sample selection section, and an additional switch that temporarily connects the output of the first inverter to the input of the first inverter prior to the display period; and the switch is coupled to a reference signal that has a state equal to a predetermined inverter threshold-voltage when the additional switch connects the output of the first inverter to the input of the first inverter.

13. An analog drive circuit for driving a pixel electrode in response to an analog sample derived from a video signal composed of alternating odd and even frames each having a frame period, the analog drive circuit comprising:

an odd sample selection that receives and temporarily stores the analog sample only when the analog sample is taken from one of the odd frames;

an even sample selection section that receives and temporarily stores the analog sample when the analog sample is taken from one of the even frames; and a drive signal generator that, during a display period that follows the sample load period, generates a drive signal and applies the drive signal to the pixel electrode, the drive signal being composed of a sequence of a first temporal portion and a second temporal portion, the first temporal portion having a time duration substantially proportional to the analog sample temporarily stored in the sample selection section, the second temporal portion being a temporal complement of the first temporal portion, the drive signal generator operating, during a display period coincident with each sample load period in which the analog sample is taken from one of the even frames, to generate the drive signal in response to the analog sample stored in the odd sample selection section, and, during a display period coincident with each sample load period in which the analog sample is taken from one of the odd frames, to generate the drive signal in response to the analog sample temporarily stored in the even sample selection section.

14. The analog drive circuit of claim 13, in which each of the sample selection sections includes:

a sample storage element;

a sample selection gate that opens during the sample load period to admit the analog sample to the sample storage element, the sample selection gate of the odd sample selection section opening in antiphase to the sample selection gate of the even sample selection section; and a sample output gate that opens only during the display period, the sample output gate being disposed between the sample storage element and the drive signal generator, the sample output gate of the odd sample selection section opening in antiphase to the sample output gate of the even sample selection section.

15. The analog drive circuit of claim 13, in which:

the drive signal generator includes a comparator that generates the drive signal, the comparator comprising a first input to which a ramp signal having a duration equal to the frame period is connected, and a second input; and the analog drive circuit additionally comprises a switching element that alternately connects the odd sample selection section and the even sample selection section to the second input of the comparator in consecutive frame periods.

16. The analog drive circuit of claim 13, in which:

the drive signal generator includes a comparator that generates the drive signal, the comparator comprising a first input and a second input and having a detection sense set by a sense control signal having opposite states in consecutive frame periods; and the analog drive circuit additionally includes:

a first switching element that alternately connects a ramp signal to (a) the first input and (b) the second input of the comparator in consecutive frame periods, the ramp signal having a duration equal to the frame period, and a second switching element that alternately connects (a) the odd sample selection section to the second input of the comparator and (b) the even sample selection section to the first input of the comparator in consecutive frame periods.

17. The analog drive circuit of claim 13, in which the drive signal generator includes:

an inverter that generates the drive signal, the inverter having an input;

a capacitor having a first electrode and a second electrode, the first electrode being connected to the input of the inverter and to the sample selection section, the second electrode being connected to a ramp signal having a duration equal to the frame period; and a switch that discharges the capacitor prior to the frame period.

18. The analog drive circuit of claim 17, in which:
the analog drive circuit additionally includes:
a coupling capacitor providing the connection between the sample selection section and the input of the inverter, and
a second switch that connect the output of the inverter to the input of the inverter prior to the display period; and
the switch is coupled to a reference signal that has a state equal to a predetermined inverter threshold voltage when the additional switch connects the output of the inverter to the input of the inverter.

19. The analog drive circuit of claim 13, in which:
the sequence of the first temporal portion and the second temporal portion is a first sequence of the first temporal portion and the second temporal portion and has a duration equal to one-half of the frame period; and
the drive signal generator generates the drive signal in a first electrical state during the first temporal portion and in a second electrical state during the second temporal portion, and generates the drive signal additionally composed of a second sequence of the first temporal portion in which the drive signal is in the second electrical state and the second temporal portion in which the drive signal is in the first electrical state, the first temporal portion and the second temporal portion being in any order in the second sequence.

20. The analog drive circuit of claim 19, in which:
the drive signal generator includes a comparator that generates the drive signal and has a detection sense set by a sense control signal that changes state half-way through the display period, the comparator comprising a first input to which is connected a ramp signal having a duration equal to one-half of the frame periods, and a second input; and
the analog drive circuit additionally comprises a switching element that alternately connects (a) the odd sample selection section and (b) the even sample selection section to the second input of the comparator in consecutive frame periods.

21. The analog drive circuit of claim 19, in which:
the drive signal generator includes a comparator that generates the drive signal, the comparator comprising a first input and a second input and having a detection sense set by a sense control signal having opposite states in consecutive frame periods; and
the analog drive circuit additionally comprises:
a first switching element that alternately connects a ramp signal to (a) the first input and (b) the second input of the comparator in consecutive frame periods, the ramp signal having a duration of one-half of the frame period, and
a second switching element that alternately connects (a) the odd sample selection section to the second input of the comparator and (b) the even sample selection section to the first input of the comparator in consecutive frame periods.

22. The analog drive circuit of claim 19, in which the drive signal generator includes:
a first inverter, the first inverter having an input and an output;
a second inverter having an input connected to the output of the first inverter, the second inverter having an output;
a capacitor having a first electrode and a second electrode, the first electrode being connected to the input of the first inverter and to the sample selection section, the second electrode being connected to a ramp signal having a duration equal to one-half of the frame period;
a switch that discharges the capacitor prior to the frame period; and
a switching arrangement connected to the outputs of the first inverter and the second inverter and operating in response to a sense control signal that changes state half-way through the frame period to take the output of one of (a) the first inverter and (b) the second inverter as the drive signal.

23. The analog drive circuit of claim 22, in which:
the analog drive circuit additionally includes:
a coupling capacitor connecting the sample selection section to the input of the first inverter, and
a second switch that connect the output of the first inverter to the input of the first inverter prior to the frame period; and
the switch is coupled to a reference signal that has a state equal to a predetermined first inverter threshold voltage when the additional switch connects the output of the first inverter to the input of the first inverter.

24. An analog drive circuit for driving a pixel electrode in response to an analog sample derived from a video signal that includes a color component for each of more than one color;
a sample selection section including:
a sample storage element corresponding to each color component,
a sample selection gate that opens during a sample load period to admit the analog sample of each color component to each respective sample storage element, and
a sample output gate disposed between each sample storage element and the drive signal generator, the sample output gates operating sequentially to connect the analog sample stored in each sample storage element to the drive signal generator; and
a drive signal generator that operates during a display period that follows the sample load period to generate sequentially a drive signal in response to the analog sample stored in each sample storage element, and to apply each drive signal to the pixel electrode, each drive signal being composed of a sequence of a first temporal portion and a second temporal portion, the first temporal portion having a time duration substantially proportional to the analog sample temporarily stored in the corresponding sample selection section, the second temporal portion being a temporal complement of the first temporal portion.

25. The analog drive circuit of claim 24, in which:
the drive signal generator includes a comparator that generates the drive signal, the comparator comprising a first input and a second input and having a detection sense set by a sense control signal having opposite states in consecutive frame periods; and
the analog drive circuit additionally comprises:
a first switching element that alternately connects a ramp signal to (a) the first input and (b) the second input of the comparator in consecutive frame periods, the ramp signal having a duration of one-half of the frame period, and
a second switching element that alternately connects (a) the odd sample selection section to the second input of the comparator and (b) the even sample selection section to the first input of the comparator in consecutive frame periods.

26. The analog drive circuit of claim 1, in which the video signal is a color-sequential video signal.

27. An analog drive circuit for driving a pixel electrode in response to an analog sample derived from a video signal, the analog drive circuit comprising:

a sample selection section that receives and temporarily stores the analog sample during a sample load period: and a drive signal generator that, during a display period that follows the sample load period, generates a drive signal and applies the drive signal to the pixel electrode, the drive signal being composed of a sequence of a first temporal portion and a second temporal portion, the first temporal portion and the second temporal portion each having a beginning, the first temporal portion having a time duration substantially proportional to the analog sample temporarily stored in the sample selection section, the second temporal portion being a temporal complement of the first temporal portion, the drive signal being composed of pulse having a first polarity at the beginning of the first temporal portion and a pulse having a second polarity, opposite the first polarity, at the beginning of the second portion.

28. The analog drive circuit of claim 27, in which the drive signal generator includes an a.c.—coupled output.

* * * * *